(12) United States Patent
Sekiguchi et al.

(10) Patent No.: US 9,851,944 B2
(45) Date of Patent: Dec. 26, 2017

(54) OPERATION SEARCH METHOD AND OPERATION SEARCH APPARATUS

(71) Applicant: FUJITSU LIMITED, Kawasaki-shi, Kanagawa (JP)

(72) Inventors: Atsuji Sekiguchi, Kawasaki (JP); Toshihiro Shimizu, Sagamihara (JP); Takeshi Yasuie, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 307 days.

(21) Appl. No.: 14/617,254

(22) Filed: Feb. 9, 2015

(65) Prior Publication Data
US 2015/0254309 A1 Sep. 10, 2015

(30) Foreign Application Priority Data
Mar. 10, 2014 (JP) ................................. 2014-046631

(51) Int. Cl.
*G06F 17/30* (2006.01)
*G06F 7/36* (2006.01)
(Continued)

(52) U.S. Cl.
CPC .................. *G06F 7/36* (2013.01); *G06F 9/44* (2013.01); *G06F 9/44505* (2013.01); *G06F 11/00* (2013.01)

(58) Field of Classification Search
CPC ............... G06F 17/30; G06F 17/30424; G06F 17/30451; G06F 17/30637; G06F 17/30542; G06F 17/30958
(Continued)

(56) References Cited

U.S. PATENT DOCUMENTS 7,801,894 B1 * 9/2010 Bone ................. G06F 17/30091
707/737
2012/0079485 A1 3/2012 Kikuchi
2014/0013099 A1 1/2014 Sekiguchi et al.

FOREIGN PATENT DOCUMENTS

JP 06-250884 9/1994
JP 2006-146503 6/2006
(Continued)

OTHER PUBLICATIONS

Japanese Office Action dated Aug. 22, 2017 for corresponding Japanese Patent Application No. 2014-046631, with English Translation, 7 pages.
(Continued)

*Primary Examiner* — Isaac M Woo
(74) *Attorney, Agent, or Firm* — Fujitsu Patent Center

(57) ABSTRACT

A determination unit determines a precondition indicating an expected state of a system that is to execute processing corresponding to an operation, and a postcondition indicating an expected state of the system that has executed the processing corresponding to the operation, based on a work log of previously-performed work. An association unit associates each of a plurality of operations with an operation whose precondition matches a postcondition of the each of the plurality of operations. A search unit searches for a path that starts from an operation whose precondition matches an initial condition satisfied by an operation object system, traces an associated operation, and reaches an operation whose postcondition matches a target condition indicating a target state of the operation object system after work. A generation unit generates an operation procedure in which operations on the path found by the search are arranged in order.

8 Claims, 27 Drawing Sheets

(51) Int. Cl.
  *G06F 9/44*    (2006.01)
  *G06F 9/445*   (2006.01)
  *G06F 11/00*   (2006.01)
(58) Field of Classification Search
  USPC .................................................. 707/600–899
  See application file for complete search history.

(56) References Cited

FOREIGN PATENT DOCUMENTS

WO    2010/140240 A1    12/2010
WO    2012/124018        9/2012

OTHER PUBLICATIONS

Kubo, Kouji et al., "Command Prediction Based on System's State and Commands Dependence", SIG Human-Computer Interaction, Information Processing Society of Japan, 1995-HI-062, Sep. 14, 1995, pp. 75-82, See JPOA filed herewith and English Abstract.

* cited by examiner

| Attribute Name | Method of Obtaining Attribute Value | Example of Attribute Value |
|---|---|---|
| Name | Combine file path and argument of command | /usr/bin/yum [yum, install, mysql] |
| Executed by | Obtain using "whoami" or the like | root |
| OS Type | Obtain using "uname -srvi" or the like | Linux 2.6.32-358.23.2.el6.x86_64 #1 SMP Wed Oct 16 18:37:12 UTC 2013 x86_64 |
| File Path of Command | Obtain from argument of execve | /usr/bin/yum |
| Version of Command | Obtain using "rpm -qa \| grep command name" as version of package | yum-3.2.29-40.el6.centos.noarch |
| Size of Command | Obtain using "file path of ls -l command" or the like | 801 Bytes |
| Hush of Command | Obtain using "file path of md5sum command" or the like | Af3eaddb82d77ebb8eaa42e2 7f61b2ed |

FIG. 11

| Attribute Name | Method of Obtaining Attribute Value | Example of Attribute Value |
|---|---|---|
| Name | file path | /lib64/libc-2.12.so |
| Owner | Obtain from result of "ls -l file path" or the like | root |
| Group | Obtain from result of "ls -l file path" or the like | root |
| Access Permission | Obtain from result of "ls -l file path" or the like | 0644 |
| Size | Obtain from result of "ls -l file path" or the like | 1916568 Bytes |
| Hush | Obtain from result of "file path of md5sum command" or the like | f0dac9e070314da374ca1ca29a1a4fdb |

FIG. 13

OPERATION SEARCH METHOD AND OPERATION SEARCH APPARATUS

CROSS-REFERENCE TO RELATED APPLICATION

This application is based upon and claims the benefit of priority of the prior Japanese Patent Application No. 2014-046631, filed on Mar. 10, 2014, the entire contents of which are incorporated herein by reference.

FIELD

The embodiments discussed herein are related to an operation search method and an operation search apparatus.

BACKGROUND

When conducting the operational management of systems such as information and communication technology (ICT) systems, the system configuration is often changed due to installation, version upgrade, or the like of the operating system (OS) and the middleware.

As an effective technique for changing the system configuration, there has been proposed a module test support apparatus capable of efficiently carrying out a module unit test for ensuring the reliability of software that is newly installed, for example. There has also been proposed a technique that efficiently verifies the validity of the execution environment, consistency, and continuous executability of a batch file.

When changing the system configuration, it is important to improve the efficiency of changing the configuration. Changing the system configuration involves work such as starting and stopping the system, changing the setting values of the system, updating the software, and so on, for example. Thus, if the administrator creates a work procedure from scratch each time such work is needed, the work efficiency decreases, and errors are likely to occur.

In view of the above, it has been proposed to create an operation procedure specific to an operation object system by using an existing operation procedure. For example, there is a technique that outputs procedure information containing specific information specific to a system to which changes are to be made, based on a collection of procedure information pieces each indicating an operation procedure for a configuration change corresponding to the content of a system configuration change. With this technique, it is possible to improve the efficiency of changing the system configuration.

See, for example, Japanese Laid-open Patent Publication No. 06-250884, Japanese Laid-open Patent Publication No. 2006-146503, and International Publication Pamphlet No. WO2012/124018.

However, the conventional techniques reuse an entire previously-executed operation procedure that includes a series of operations. Therefore, it is not possible to reuse the operation procedure unless the operation object system is in an environment in which the entire operation procedure is executable. That is, the operation procedure may be reused only in limited situations. For example, if even a part of the operations included in the operation procedure is not executable by the operation object system, it is not possible to reuse the operation procedure to create a new operation procedure for the operation object system. Therefore, patterns of operation procedures that may be created by reusing previously-executed operation procedures of work are limited. Thus, it might not be possible to generate an intended operation procedure.

SUMMARY

According to one aspect of the invention, there is provided a non-transitory computer-readable storage medium storing a computer program that causes a computer to perform a process including: determining, based on a work log indicating a plurality of operations executed in previously-performed system change work and processing executed in accordance with the plurality of operations, a precondition and a postcondition for each of the plurality of operations, the precondition indicating an expected state of a system that is to execute processing corresponding to the each of the plurality of operations, the postcondition indicating an expected state of the system that has executed the processing corresponding to the each of the plurality of operations; associating each of the plurality of operations with an operation whose precondition matches a postcondition of the each of the plurality of operations; searching for a path that starts from an operation whose precondition matches an initial condition satisfied by an operation object system, traces an associated operation, and reaches an operation whose postcondition matches a target condition indicating a target state of the operation object system after work; and generating an operation procedure in which operations on the path found by the search are arranged in order.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 illustrates an example of a method of obtaining the attributes of an operation;

FIG. 13 illustrates an example of a method of obtaining the attributes of a condition;

DESCRIPTION OF EMBODIMENTS

Figure 1:
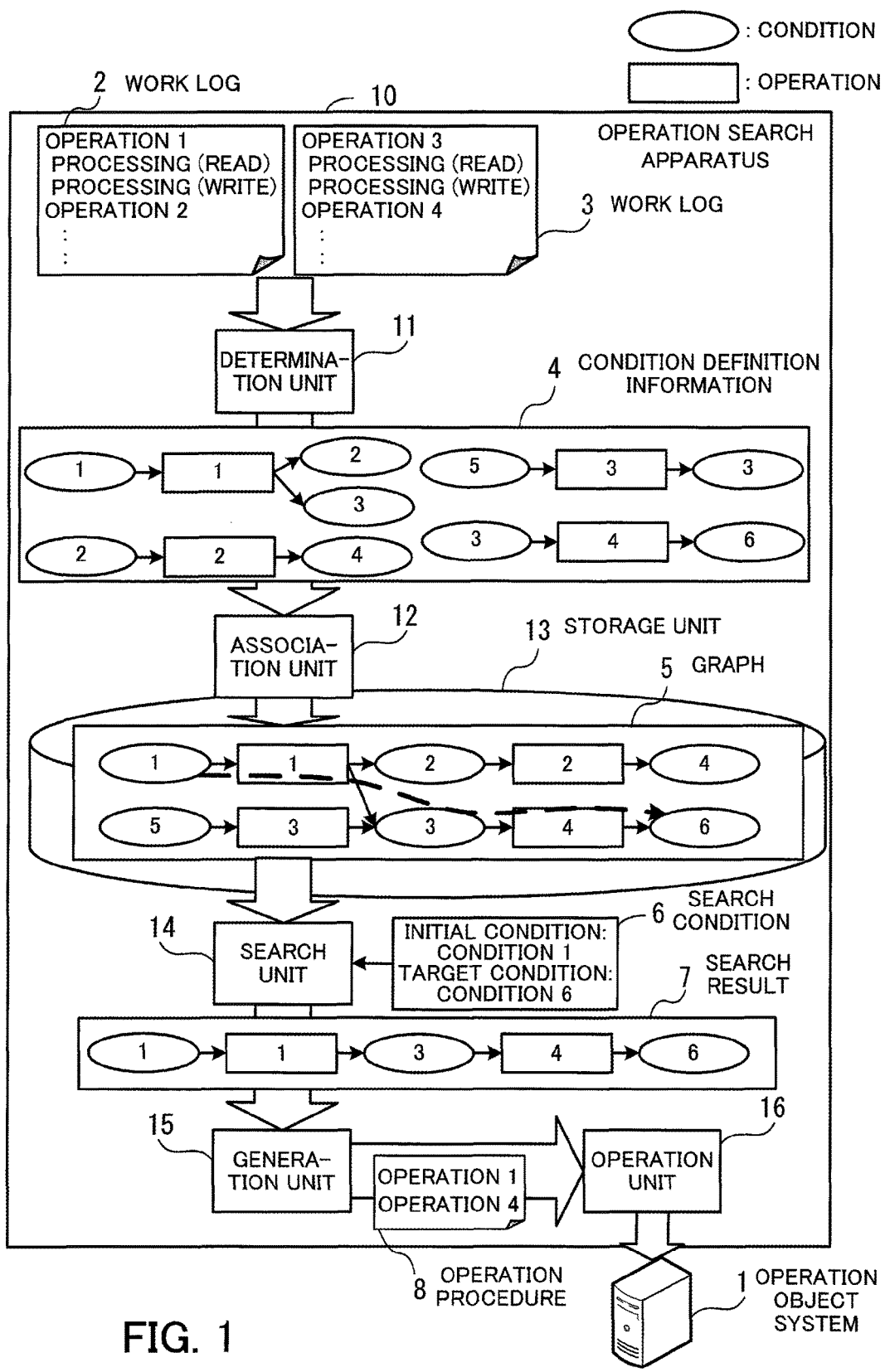
FIG. 1 illustrates an exemplary functional configuration of an operation search apparatus according to a first embodiment.

Several embodiments will be described below with reference to the accompanying drawings, wherein like reference numerals refer to like elements throughout. Note that features of certain embodiments may be combined with features of other embodiments as long as no inconsistency arises.

(a) First Embodiment

First, a description will be given of a first embodiment.

FIG. 1 illustrates an exemplary functional configuration of an operation search apparatus 10 according to the first embodiment. The operation search apparatus 10 is configured to automatically generate an operation procedure for placing an operation object system 1 in the desired state. Thus, the operation search apparatus 10 includes a determination unit 11, an association unit 12, a storage unit 13, a search unit 14, a generation unit 15, and an operation unit 16.

The determination unit 11 acquires work logs 2 and 3 each storing a plurality of operations executed in previously-performed system change work and processing executed in accordance with the plurality of operations. Each of the work logs 2 and 3 stores the content of operations performed on a system during system change work, and stores processing executed in the system in accordance with the operations. The content of an operation is, for example, a command input to a system. Processing executed in accordance with an operation is, for example, file read processing, file write processing, or the like, corresponding to a command.

Then, the determination unit 11 determines, for each of the plurality of operations, a precondition indicating an expected state of a system that is to execute processing corresponding to the operation, and a postcondition indicating an expected state of the system that has executed the processing corresponding to the operation, based on the acquired work logs 2 and 3. Note that the term "condition" hereinafter refers to either a precondition or a postcondition.

A precondition exists for each processing that is executed in accordance with an operation, for example. A precondition may be, for example, a condition "a system has files to be read upon execution of processing corresponding to an operation". In this case, a list of files to be read upon execution of processing corresponding to an operation is defined in the precondition.

A postcondition exists for each processing corresponding to an operation, for example. A precondition may be, for example, a condition "a system has files generated by execution of processing corresponding to an operation". In this case, a list of files generated by execution of processing corresponding to an operation is defined in the postcondition.

After determining a precondition and a postcondition of each operation, the determination unit generates condition definition information 4 associating the precondition and the postcondition with the operation, and transmits the condition definition information 4 to the association unit 12.

The association unit 12 associates each of the plurality of operations with an operation whose precondition matches a postcondition of the each of the plurality of operations. For example, the association unit 12 creates a graph 5 based on the condition definition information 4. In the graph 5, each of the plurality of operations is a transition source operation, and an operation whose precondition matches a postcondition of the transition source operation is a transition destination operation. Thus, the graph 5 defines a transition from the transition source operation to the transition destination operation. In the graph 5, a transition from an operation to another operation is defined as a transition that is made via a condition indicating a precondition or a postcondition, for example. The association unit 12 stores the created graph 5 in the storage unit 13.

The storage unit 13 stores the graph 5. The storage unit 13 may be, for example, a non-volatile storage medium. Note that in the case where a path search using the graph 5 is executed immediately after creation of the graph 5, a memory serving as a primary storage device may be used as the storage unit 13.

The search unit 14 searches for a path that starts from an operation whose precondition matches an initial condition satisfied by the operation object system 1, traces an associated operation, and reaches an operation whose postcondition matches a target condition indicating a target state of the operation object system after work. For example, the search unit 14 searches for a path in the graph 5 based on a search condition 6. The search condition 6 includes an initial condition satisfied by the operation object system 1, and a target condition to be satisfied by the operation object system 1 upon performing work. For example, the search unit 14 searches the graph 5 for a path that starts from an operation whose precondition matches an initial condition, traces a transition to an operation whose precondition matches a postcondition of an already traced operation or the initial condition, and reaches an operation whose postcondition matches the target condition. The search unit 14 transmits a search result 7 to the generation unit 15.

The generation unit 15 generates an operation procedure 8 in which operations on the path found by the search are arranged in order, based on the search result 7. Then, the generation unit 15 transmits the generated operation procedure 8 to the operation unit 16.

The operation unit 16 operates the operation object system 1, in accordance with the operation procedure 8.

According to this operation search apparatus 10, when the work logs 2 and 3 are input, the determination unit 11 determines a precondition and a postcondition of each of a plurality of operations, based on the acquired work logs 2 and 3. In the example of FIG. 1, the work log 2 includes an "operation 1" and an "operation 2", and the work log 3 includes an "operation 3" and an "operation 4". Accordingly, the determination unit 11 determines a precondition and a postcondition of each of the four operations. Then, the determination unit 11 generates condition definition information 4 indicating a precondition and a postcondition of each operation.

The condition definition information 4 may be represented by a graph including, for example, nodes representing preconditions and postconditions, and nodes representing operations. In this graph, a node representing a precondition and a node representing an operation are connected by an edge. Further, a node representing an operation and a node representing a postcondition are connected by an edge.

Then, the association unit 12 creates a graph 5, based on the condition definition information 4 defining a precondition and a postcondition of each operation. In the example of FIG. 1, a postcondition of the "operation 1" is a "condition 2", and a precondition of the "operation 2" is the "condition 2". Thus, the association unit 12 combines the graph of the "operation 1" and the graph of the "operation 2" that are separately provided in the condition definition information 4. For example, the node of the "condition 2" connected to the node of the "operation 1" by an edge is connected to the node of the "operation 2" by an edge. Similarly, graphs of the respective operations in the condition definition information 4 are combined into the final graph 5, based on the identical conditions. The created graph 5 is stored in the storage unit 13.

Subsequently, when the search condition 6 is input, the search unit 14 searches the graph 5 for a path corresponding to the search condition 6. In the example of FIG. 1, the search condition 6 specifying a "condition 1" as the initial condition and specifying a "condition 6" as the target condition is input. In the graph 5, the initial condition "condition 1" matches a precondition of the "operation 1". As a postcondition of the "operation 1", a "condition 3" is present. The "condition 3" is also a precondition of an "operation 4". That is, there is a transition from the "operation 1" to the "operation 4" via the "condition 3". As a postcondition of the "operation 4", the target condition "condition 6" is present. As a result, a transition path that passes through the "operation 1" and the "operation 4" in the graph 5 is output as the search result 7.

The generation unit 15 generates the operation procedure 8, based on the search result 7. In the example of FIG. 1, the generated operation procedure 8 indicates that the "operation 1" and the "operation 4" are performed in this order. Then, the operation unit 16 performs operations on the operation object system 1, in accordance with the operation procedure 8. As a result, processing corresponding to the operations is executed in the operation object system 1, so that the target condition is satisfied in the operation object system 1.

As described above, according to the operation search apparatus 10 of the first embodiment, it is possible to create the operation procedure 8 by reusing previously-performed work in units of operations. This increases the chances of being able to automatically generate an operation procedure applicable to the operation object system.

For example, in the example of FIG. 1, none of the work logs 2 and 3 describes work for making changes such that a system satisfying the initial condition "condition 1" satisfies the target condition "condition 6". Therefore, even if an attempt is made to reuse part of the previously-performed operation procedures, based on the work logs 2 and 3 indicating the previously-performed operation procedures, it is not possible to create an operation procedure that satisfies the search condition 6. However, in the first embodiment, it is possible to create the operation procedure 8 that matches the search condition 6 by breaking down, in units of operations, the operation procedure of previously-performed work and combining operations based on common conditions shared between the operations. In other words, it is possible to reuse the operation procedure of previously-executed work in small granularity. This increases the types of operation procedures that may be generated. That is, this increases the likelihood of being able to automatically generate an operation procedure for making the operation object system 1 satisfy the target condition.

There may be cases where when the operation object system 1 is operated in accordance with the generated operation procedure 8, intended processing is not executed. For example, there are cases where different processing results are obtained due to the version difference between programs that execute processing. In view of this, the operation search apparatus 10 may determine in advance whether it is possible to execute processing corresponding to the operation procedure 8.

For example, a state of a system in which processing corresponding to each operation is executable may be calculated. Then, the operation procedure 8 may be created by combining operations that are executable in a state of the operation object system 1. In this case, for example, the determination unit 11 calculates a state of a system in which processing corresponding to each of a plurality of operations is executable, based on the work logs 2 and 3. Then, the association unit 12 searches for a path by tracing a transition to an operation that is executable in a state of the operation object system 1. Thus, it is possible to improve the reliability in that the generated operation procedure 8 is applicable to the operation object system.

Further, the operation procedure 8 may be created after confirming that information used in processing corresponding to an operation is usable in the operation object system 1. In this case, the determination unit 11 calculates, for information that is defined to be present in a system by a precondition or a postcondition, a state of a system in which the information is usable, based on the work logs 2 and 3. Then, the association unit 12 searches for a path by tracing a transition to an operation in which information used in each of a precondition and a postcondition thereof is usable in the operation object system 1, among operations included in the graph 5. Thus, it is possible to improve the reliability in that the generated operation procedure is applicable to the operation object system.

In the above description, the content of the work logs 2 and 3 of previously-executed work is reflected to the graph 5. However, the graph 5 may be updated at any time in accordance with the result of an operation on the operation object system 1. In this case, the operation search apparatus 10 repeatedly executes the following process, after creating the operation procedure 8, for example.

(Step 1) Each time an operation procedure is generated, the operation unit 16 executes the first operation indicated in the operation procedure, with respect to the operation object system 1.

(Step 2) Each time an operation is executed, the association unit 12 updates the graph 5 by adding a condition that is satisfied by the operation object system 1 in response to execution of the operation, to a postcondition of the operation.

(Step 3) Each time an operation is executed, the search unit 14 adds a condition generated for the operation object system 1 in response to execution of the operation, to an initial condition. Further, the search unit 14 searches the graph 5 for a path that starts from an unexecuted operation whose precondition matches an initial condition, traces an operation whose precondition matches a postcondition of an already traced operation or the initial condition, and reaches an operation whose postcondition matches the target condition.

(Step 4) Each time a path is found by the search, the generation unit 15 generates an operation procedure in which operations on the found path are arranged in order.

The processing of (Step 1) through (Step 4) described above is repeated until an operation whose postcondition matches the target condition is executed. This makes it possible to generate an operation procedure that the generation unit 15 is not able to generate from only the work logs 2 and 3 of previously-performed work. That is, this increases the likelihood of being able to automatically generate an operation procedure for making the operation object system 1 satisfy the target condition.

Note that the determination unit 11, the association unit 12, the search unit 14, the generation unit 15, and the operation unit 16 of FIG. 1 may be realized by, for example, the processor of the operation search apparatus 10. The storage unit 13 may be realized by, for example, the memory of the operation search apparatus 10. The lines connecting the elements of FIG. 1 represent some of communication paths. Communication paths other than those of FIG. 1 may be provided.

(b) Second Embodiment

Next, a description will be given of a second embodiment. In the second embodiment, work logs are collected from a large number of ICT systems, and thus an operation procedure for a specific ICT system may be generated automatically.

Figure 2:
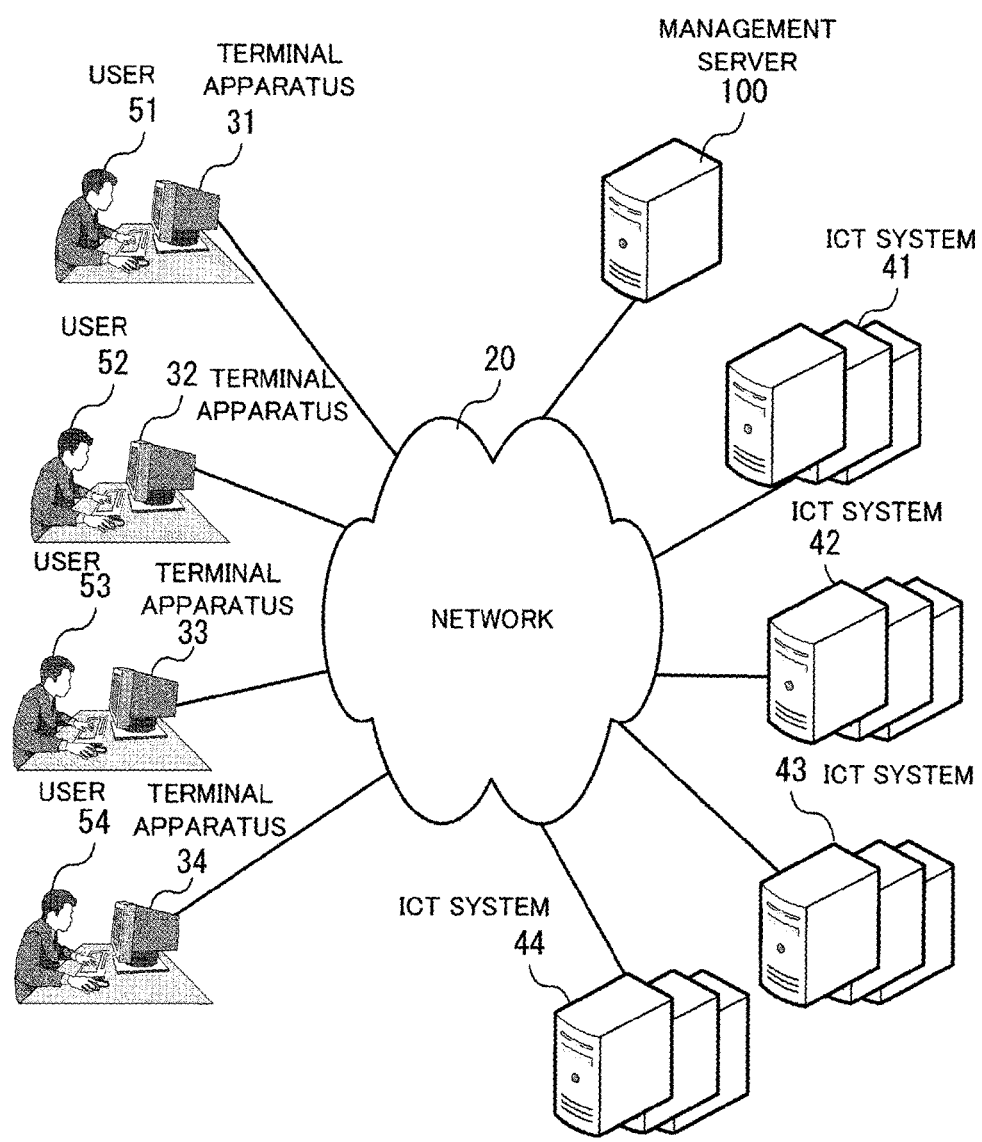
FIG. 2 illustrates an exemplary system configuration according to a second embodiment.

FIG. 2 illustrates an exemplary system configuration according to the second embodiment. In the second embodiment, a management server 100 is provided as an example of the operation search apparatus 10 of the first embodiment of FIG. 1. A plurality of ICT systems 41 through 44 are connected to the management server 100 via a network 20. Each of the plurality of ICT systems 41 through 44 includes a server, a storage apparatus, a network switch, and so on.

Further, terminal apparatuses 31 through 34 used by users 51 through 54, respectively, are connected to the network 20. The ICT systems 41 through 44 are managed by different users. Each of the ICT systems 41 through 44 includes one or more servers.

In the example of FIG. 2, the user 51 manages the ICT system 41 by using the terminal apparatus 31. The user 52 manages the ICT system 42 by using the terminal apparatus 32. The user 53 manages the ICT system 43 by using the terminal apparatus 33. The user 54 manages the ICT system 44 by using the terminal apparatus 34.

The management server 100 is a computer that supports the users 51 through 54 to perform operational management of the ICT systems 41 through 44. The management server 100 acquires, from the ICT systems 41 through 44, the content of operations that are performed by the users 51 through 54 with respect to the ICT systems 41 through 44 via the terminal apparatuses 31 through 34, and stores the acquired content of operations as work logs. Further, the management server 100 generates a graph indicating an operation procedure corresponding to the content of work, based on the stored work logs. Further, when a procedure request is received from any of the terminal apparatuses 31 through 34 used by the users 51 through 54, the management server 100 generates an operation procedure applicable to the ICT system used by the user who handles the procedure request, and responds to the terminal apparatus that issued the procedure request.

In order to be able to generate various operation procedures, the management server 100 divides each of work logs of procedures of a large number of operators into small segments in units of operations, clarifies the operating conditions of each operation, and generates an operation procedure by combining operations.

Figure 3:
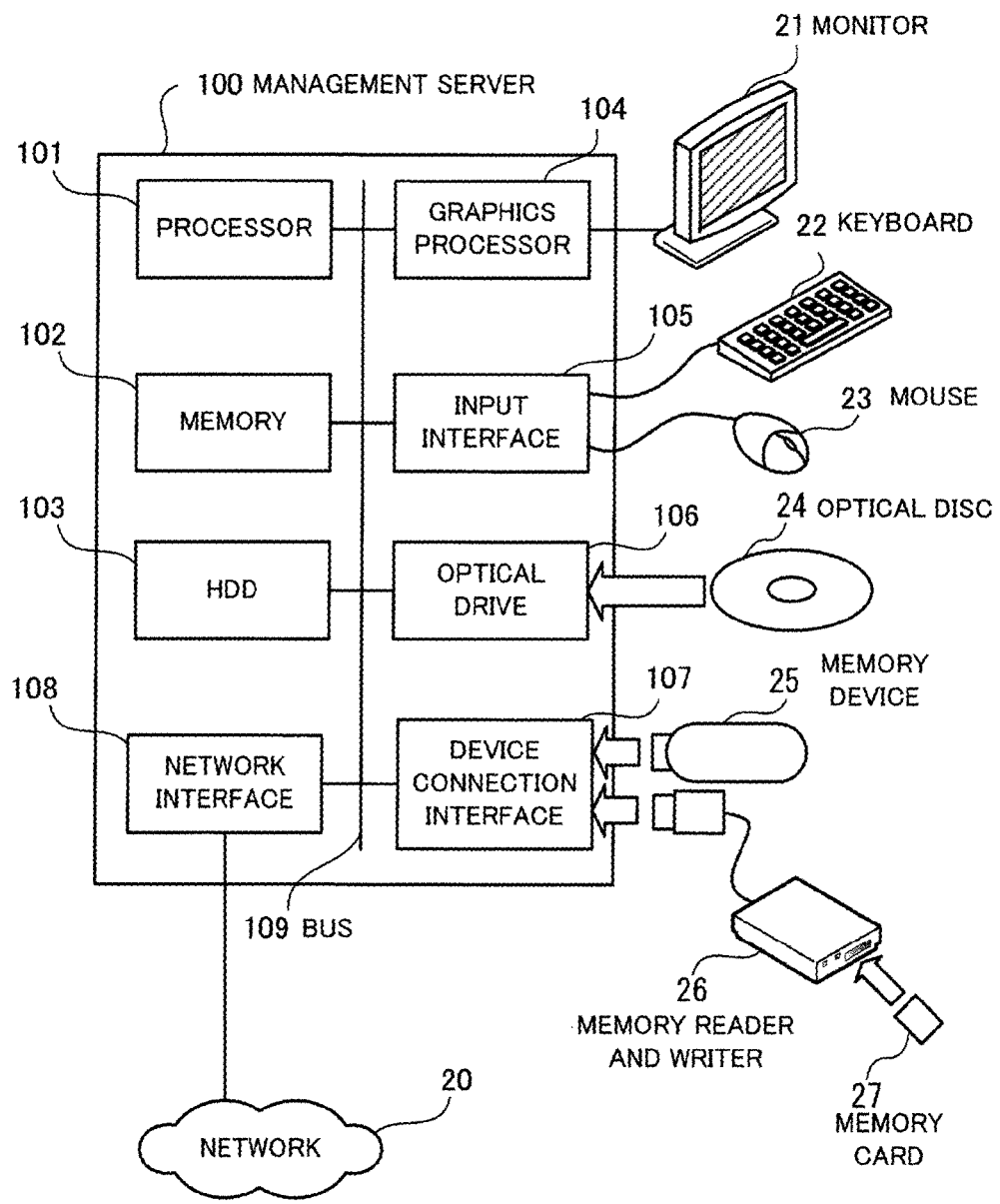
FIG. 3 illustrates an exemplary hardware configuration of a management server used in the second embodiment.

FIG. 3 illustrates an exemplary hardware configuration of the management server 100 used in the second embodiment. The entire operation of the management server 100 is controlled by a processor 101. A memory 102 and a plurality of peripheral devices are connected to the processor 101 via a bus 109. The processor 101 may be a multiprocessor. Examples of the processor 101 include a central processing unit (CPU), a micro processing unit (MPU), and a digital signal processor (DSP). At least a part of functions implemented by a program executed by the processor 101 may be implemented by using electronic circuits such as an application-specific integrated circuit (ASIC), a programmable logic device (PLD), and the like.

The memory 102 is used as a primary storage device of the management server 100. The memory 102 temporarily stores at least part of the OS program and application programs that are executed by the processor 101. The memory 102 also stores various types of data needed for processing performed by the processor 101. Examples of the memory 102 include a volatile semiconductor storage device such as a random access memory (RAM) and the like.

The peripheral devices connected to the bus 109 include a hard disk drive (HDD) 103, a graphics processor 104, an input interface 105, an optical drive 106, a device connection interface 107, and a network interface 108.

The HDD 103 magnetically writes data to and reads data from its internal disk. The HDD 103 serves as a secondary storage device of the management server 100. The HDD 103 stores the OS program, application programs, and various types of data. Note that a non-volatile semiconductor storage device such as a flash memory and the like may be used as a secondary storage device.

A monitor 21 is connected to the graphics processor 104. The graphics processor 104 displays an image on the screen of the monitor 21 in accordance with an instruction from the processor 101. Examples of the monitor 21 include a display device using a cathode ray tube (CRT), a liquid crystal display device, and the like.

A keyboard 22 and a mouse 23 are connected to the input interface 105. The input interface 105 receives signals from the keyboard 22 and the mouse 23, and transmits the received signals to the processor 101. The mouse 23 is an example of a pointing device, and other types of pointing devices may also be used. Examples of other types of pointing devices include a touch panel, a tablet, a touch pad, a track ball, and the like.

The optical drive 106 reads data from an optical disc 24 by using laser beams or the like. The optical disc 24 is a portable storage medium and stores data such that the data may be read through optical reflection. Examples of the optical disc 24 include digital versatile disc (DVD), DVD-RAM, compact disc read only memory (CD-ROM), CD-Recordable (CD-R), CD-Rewritable (CD-RW), and the like.

The device connection interface 107 is a communication interface that connects peripheral devices to the management server 100. For example, a memory device 25 and a memory reader and writer 26 may be connected to the device connection interface 107. The memory device 25 is a storage medium having a function to communicate with the device connection interface 107. The memory reader and writer 26 is a device that writes data to and reads data from a memory card 27. The memory card 27 is a card-type storage medium.

The network interface 108 is connected to the network 20. The network interface 108 exchanges data with other computers or communication apparatuses via the network 20.

With the hardware configuration described above, it is possible to realize the processing functions of the second embodiment. Also, the operation search apparatus 10 of the first embodiment may be realized with the same hardware configuration as the management server 100 of FIG. 3.

The management server 100 realizes the processing functions of the second embodiment by executing a program stored in a computer-readable storage medium, for example. The program describing the procedure to be performed by the management server 100 may be stored in various storage media. For example, the program to be executed by the management server 100 may be stored in the HDD 103. The processor 101 loads at least part of the program from the HDD 103 into the memory 102 so as to execute the program. The program to be executed by the management server 100 may also be stored in a portable storage medium, such as the optical disc 24, the memory device 25, the memory card 27, and the like. The program stored in the portable storage medium may be executed after being installed into the HDD 103 under the control of, for example, the processor 101. Further, the processor 101 may execute the program by reading the program directly from the portable storage medium.

Figure 4:
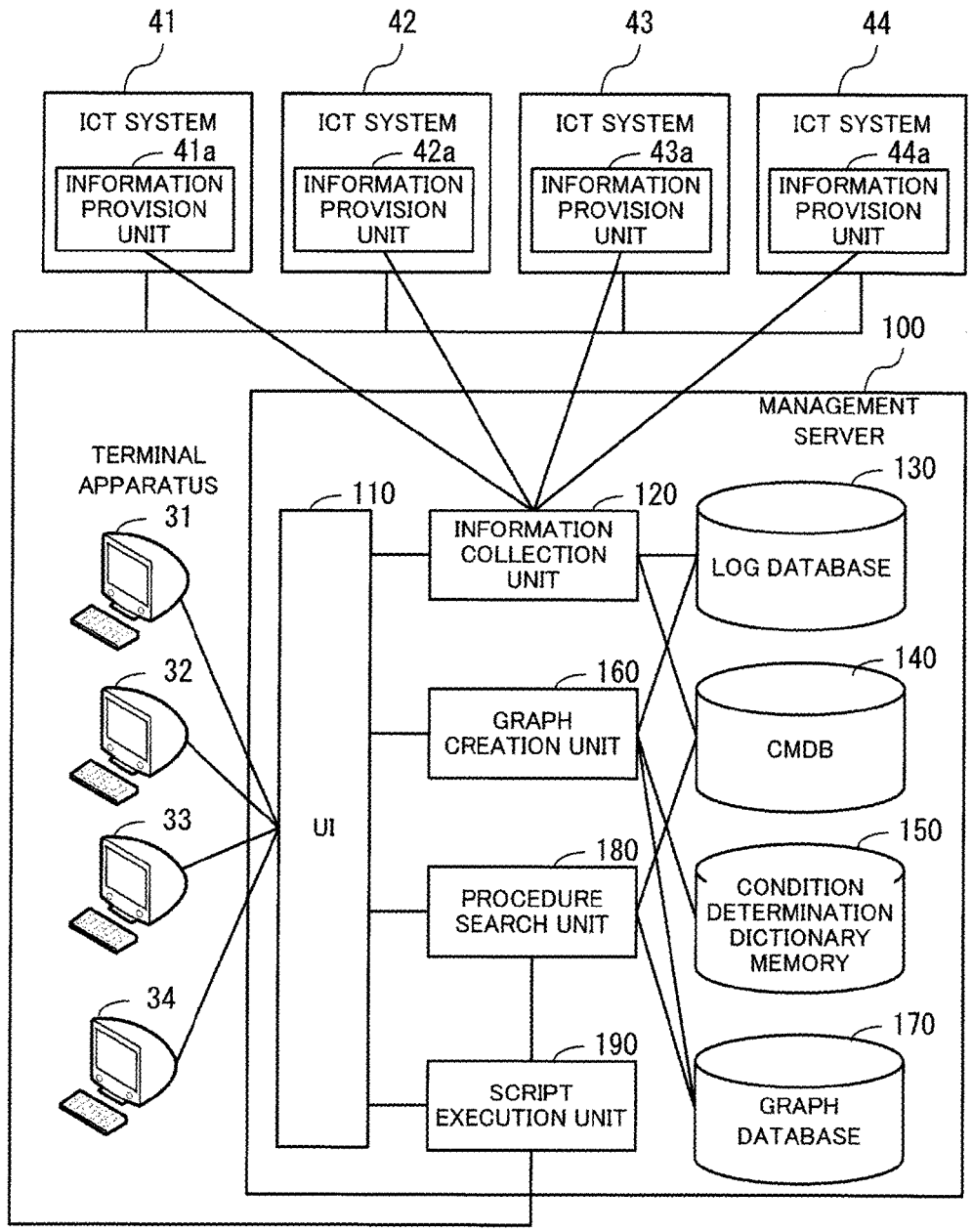
FIG. 4 illustrates the functions of ICT systems and the management server according to the second embodiment.

FIG. 4 illustrates the functions of the ICT systems 41 through 44 and the management server 100 according to the second embodiment. The ICT systems 41 through 44 include information provision units 41a, 42a, 43a, and 44a, respectively. The information provision units 41a, 42a, 43a, and 44a acquire logs of operations performed on the ICT systems 41 through 44, respectively, and transmit the logs to the management server 100. Further, the information provision units 41a, 42a, 43a, and 44a transmit configuration information pieces of the ICT systems 41 through 44 to the management server 100. Each of the configuration information pieces of the ICT systems 41 through 44 includes information indicating the hardware status and information indicating the software status. The hardware status includes the hardware configuration and the current operational state of each piece of hardware. The software status includes the software configuration and the current operational state of each piece of software.

The management server 100 includes a user interface (UI) 110, an information collection unit 120, a log database 130, a configuration management database (CMDB) 140, a condition determination dictionary memory 150, a graph creation unit 160, a graph database 170, a procedure search unit 180, and a script execution unit 190.

The user interface 110 receives inputs from the terminal apparatuses 31 through 34. Then, the user interface 110 transmits the content of inputs received from the terminal apparatuses 31 through 34, to the information collection unit 120, the graph creation unit 160, the procedure search unit 180, or the script execution unit 190. Further, the user interface 110 transmits the output content received from the information collection unit 120, the graph creation unit 160, the procedure search unit 180, or the script execution unit 190, to the terminal apparatuses 31 through 34.

The information collection unit 120 collects work logs and configuration information pieces from the ICT systems 41 through 44. The information collection unit 120 stores the collected work logs in the log database 130. Further, the information collection unit 120 stores the collected configuration information pieces in the CMDB 140.

The log database 130 stores the work logs. A part of the storage area of the memory 102 or the HDD 103 serves as the log database 130, for example.

The CMDB 140 stores the configuration information pieces of the ICT systems 41 through 44. A part of the storage area of the memory 102 or the HDD 103 serves as the CMDB 140, for example.

The condition determination dictionary memory 150 stores a condition determination dictionary as a definition for determining a precondition or a postcondition of an operation, from the work logs. A part of the storage area of the memory 102 or the HDD 103 serves as the condition determination dictionary memory 150, for example.

The graph creation unit 160 refers to the log database 130 and the condition determination dictionary memory 150, and generates a graph representing the relationship between operations performed in previous work. For example, the graph creation unit 160 breaks down a work log in units of operations, and examines the log of each operation. The graph creation unit 160 associates an operation with a system configuration changed by the operation, and thereby creates a graph representing a relationship "precondition-→operation→postcondition" for each operation.

Changes in the system configuration include changes in the file status, changes in the process status, changes in the communication status, and changes in the resource status, and so on. Changes in the file status include changes in the presence or absence of a file, changes in the content of the file, and the like. Changes in the process status include changes in the presence or absence of a running process, changes in the content of the process, and the like. Changes in the communication status include changes in the status of a Transmission Control Protocol/User Datagram Protocol (TCP/UDP) port and the like. Changes in the resource status include changes in the CPU, memory, and HDD usage, and the like.

Further, the graph creation unit 160 extracts the attributes of a condition (a precondition or a postcondition) of an operation from the log of the operation, and adds the attributes to a node representing the condition in the graph. Examples of the attributes of a condition include the name and arguments of a process and so on, such as file path, owner, access permission, version, size, hash, date of a file and so on. The state (operating environment) of an ICT system in which information indicated by the condition is usable is determined from the attributes of the condition. For example, it is determined from the access permission to the file that an operation whose precondition matches that condition is executable only on a process of a user who has an access permission to the file.

Further, the graph creation unit 160 extracts the attributes of an operation from the log of the operation, and adds the attributes to a node representing the operation in the graph. Attributes of an operation include a permission at runtime (for example, administrator), information on the running system configuration (OS type, file path, version, size, hash of commands in the operation and so on). The state (operating environment) of an ICT system in which processing corresponding to the operation is executable is determined from the attributes of the operation. For example, it is determined from the permission at runtime that the ICT system may be operated only under the user account with the permission to execute the operation.

The graph creation unit 160 stores the created graph in the graph database 170. Further, the graph creation unit 160 is able to analyze the log database 130 and determine a system environment for executing an operation and a system environment for using a file indicated in a precondition or a postcondition. If such system environments are determined, the graph creation unit 160 stores information on the system environments corresponding to the operation, the precondition, and the postcondition, as the attributes in the graph database 170.

The graph database 170 stores the created graph. A part of the storage area of the memory 102 or the HDD 103 serves as the graph database 170, for example.

The procedure search unit 180 searches for operations for making the operation object ICT system satisfy the target condition, from the graph stored in the graph database 170, based on the initial condition (the current state of the operation object system) and the target condition (the state desired to be created on the operation object system). For example, the procedure search unit 180 searches for a subgraph that connects the initial condition to the target condition, from the graph stored in the graph database 170. In this step, the procedure search unit 180 may refer to the CMDB 140, for example, and search only among operations that are executable on the operation object ICT system. For example, the procedure search unit 180 compares the configuration of the operation object system with the attributes of the conditions and operations, and searches only among the conditions or operations that match the operation object system. The procedure search unit 180 creates an operation procedure from an array of operations obtained by the search.

The script execution unit 190 creates a script for executing the operations, based on the received operation procedure. For example, the script execution unit 190 extracts the operations included in the subgraph obtained by the search, arranges the extracted operations by topological sort or the like taking the order into account, and thereby creates a script. According to topological sort, when there is an operation B whose precondition matches a postcondition of an operation A, operations found by search are sorted in an array while maintaining the positional relationship in which the operation A precedes the operation B. Then, the script execution unit 190 remotely operates the operation object ICT system, based on the created script.

Note that the graph creation unit 160 of FIG. 4 is an example of a function including the determination unit 11 and the association unit 12 of the first embodiment of FIG. 1. The log database 130 of FIG. 4 is an example of the storage unit 13 of the first embodiment of FIG. 1. The procedure search unit 180 of FIG. 4 is an example of a function including the search unit 14 and the generation unit 15 of the first embodiment of FIG. 1. The script execution unit 190 of FIG. 4 is an example of the operation unit 16 of the first embodiment of FIG. 1.

The lines connecting the elements of FIG. 4 represent some of communication paths. Communication paths other than those of FIG. 4 may be provided. Further, the functions of each element illustrated in FIG. 4 may be realized by, for example, causing a computer to execute a program module corresponding to the element.

The following describes information stored in the log database 130 in detail.

Figure 5:
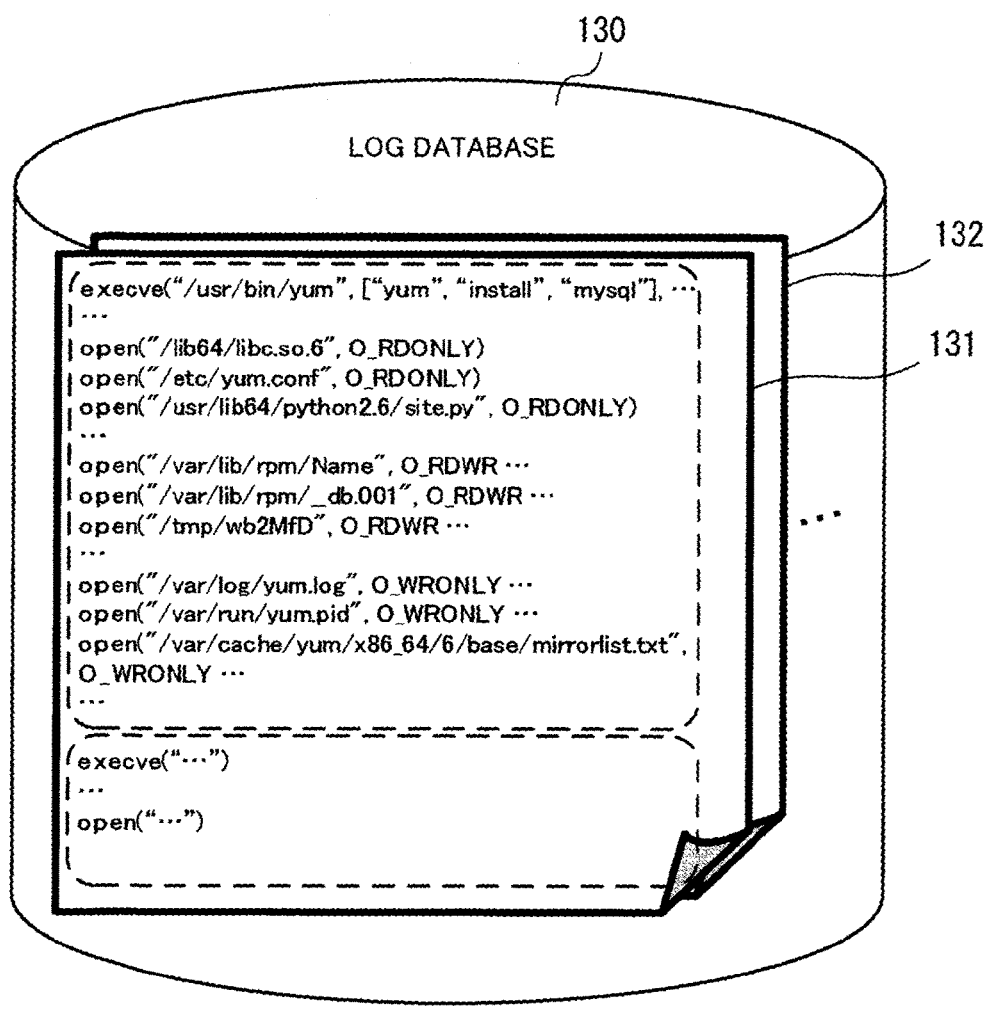
FIG. 5 illustrates an example of a work log stored in a log database.

FIG. 5 illustrates an example of a work log stored in the log database 130. The log database 130 stores a plurality of work logs 131, 132, and so on collected from the ICT systems 41 through 44. Each of the work logs 131, 132, and so on stores the content of operations performed on an ICT system during system configuration change work, and processing executed in the ICT system in accordance with the operations.

The work log 131 of FIG. 5 is a part of a log (strace log) describing operations such as "yum install mysql" and so forth that are executed on Community Enterprise Operating System (CentOS), which is one of Linux (registered trademark) distributions. In the example of the work log 131, an execve system call is executed upon execution of an operation. In this case, in the work log 131, the description from "execve" to the next "execve" or the description from "execve" to the end of the work log 131 (the description enclosed by the broken line in FIG. 5) is the log of each operation.

The log of an operation describes processing executed in accordance with the operation. Processing executed in accordance with the operation is one or more actions caused to the ICT system by the operation, for example. Actions caused by an operation include file handling and so on, such as reading a file and writing a file. In the example of FIG. 5, the lines starting with "open" are actions caused to the ICT system by the operation.

The following describes the data structure of the CMDB 140.

Figure 6:
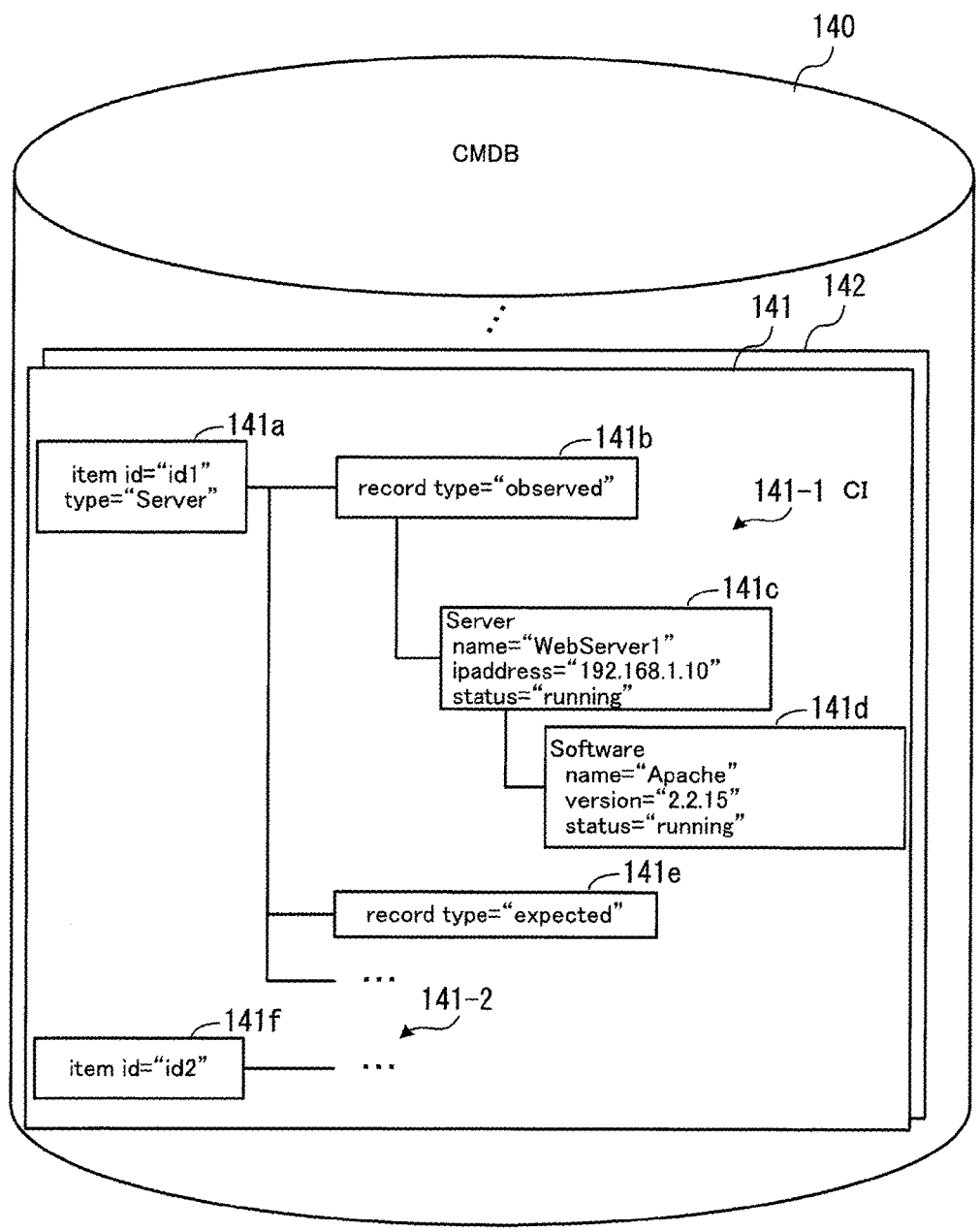
FIG. 6 illustrates an example of a CMDB.

FIG. 6 illustrates an example of the CMDB 140. The CMDB 140 stores configuration information pieces 141, 142, and so on of the respective ICT systems.

The configuration information piece 141 of the CMDB 140 includes a plurality of configuration items (CIs) 141-1, 141-2, and so on. Each configuration item corresponds to one item. An item includes a plurality of records. Under the record, configuration information of the server, network, and so on is stored in an arbitrary format.

For example, as for a configuration item 141-1, elements 141b, 141e, and so on representing records are stored under an element 141a indicating the item ID and type. Under the element 141b representing a record, a plurality of elements 141c and 141d are stored in a hierarchical structure. The first line of each of the elements 141c and 141d indicates the element name. For example, the element name of the element 141c is "Server". Further, strings in the lines under the element name in each element indicate the attributes. For example, "ipaddress="192.168.1.10"" in the element 141c is one attribute. In this string, the value of the attribute is "192.168.1.10".

The following describes the condition determination dictionary stored in the condition determination dictionary memory 150 in detail.

Figure 7:
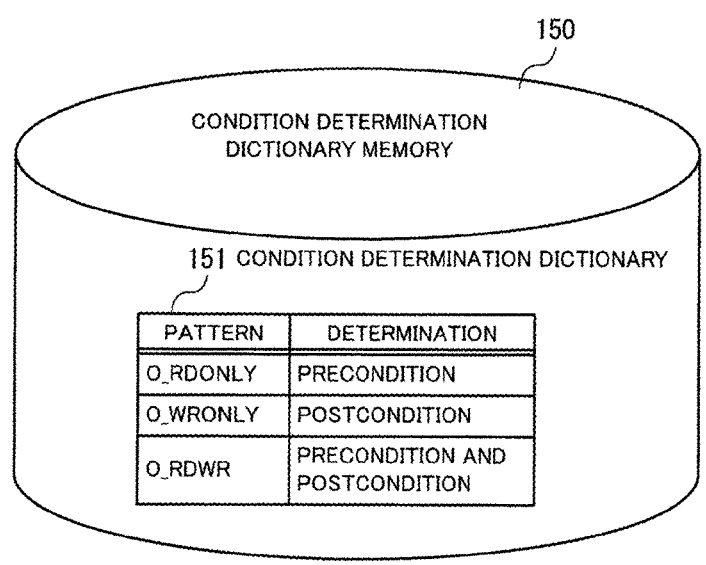
FIG. 7 illustrates an example of a condition determination dictionary.

FIG. 7 illustrates an example of a condition determination dictionary 151. The condition determination dictionary 151 stored in the condition determination dictionary memory 150 defines the determination content related to a precondition or a postcondition in association with a pattern of a string. In the example of FIG. 7, the row with "O_RDONLY" is determined to indicate a precondition. The row with "O_WRONLY" is determined to indicate a postcondition. The row with "O_RDWR" is determined to indicate a precondition and a postcondition.

The following describes the data structure of the graph database 170.

Figure 8:
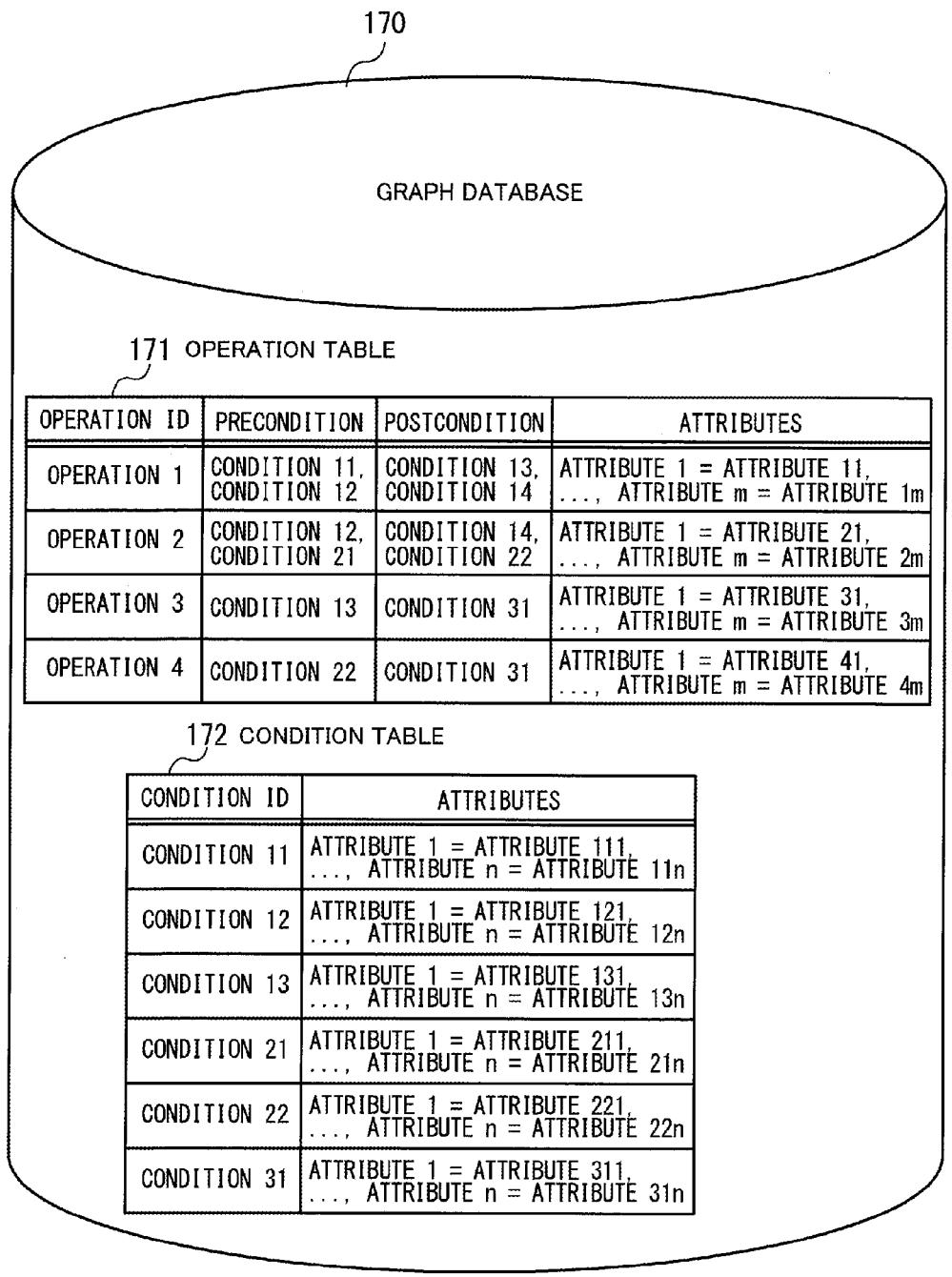
FIG. 8 illustrates an example of a graph database.

FIG. 8 illustrates an example of the graph database 170. The graph database 170 stores an operation table 171 and a condition table 172.

The operation table 171 is a data table managing information on operations. The operation table 171 includes fields for operation ID, precondition, postcondition, and attributes. The operation ID field stores identification information (operation ID) of an operation. The precondition field stores identification information (condition ID) of a precondition of the corresponding operation. The postcondition field stores identification information (condition ID) of a postcondition of the corresponding operation. The attribute field stores the attributes indicating a system environment for executing the operation. The attributes of the operation includes the attribute name and the attribute value. The attribute name and the attribute value of an operation ID "operation i" (i is an integer greater than or equal to 1) are "attribute 1=Attribute i1", . . . , and "attribute m=attribute im" (the left-hand side is the attribute name; the right-hand side is the attribute value; and m is an integer greater than or equal to 1).

In the operation table 171 of FIG. 8, the following operations and conditions are registered.

Four operations found: operation IDs "operation 1", "operation 2", "operation 3", and "operation 4"

Regarding the operation with the operation ID "operation 1", the condition IDs of its preconditions are "condition 11" and "condition 12", and the condition IDs of its postconditions are "condition 13" and "condition 14"

Regarding the operation with the operation ID "operation 2", the condition IDs of its preconditions are "condition 12" and "condition 21", and the condition IDs of its postconditions are "condition 14" and "condition 22"

Regarding the operation with the operation ID "operation 3", the condition ID of its precondition is "condition 13", and the condition ID of its postcondition is "condition 31"

Regarding the operation with the operation ID "operation 4", the condition ID of its precondition is "condition 22", and the condition ID of its postcondition is "condition 31"

The condition table 172 is a data table managing information on conditions used as preconditions or postconditions. The condition table 172 includes fields for condition ID and attributes. The condition ID field stores identification information (condition ID) of a condition. The attribute field stores the attributes indicating an expected state of the system. The attributes of the condition includes the attribute name and the attribute value. The attribute name and the attribute value of a condition ID "condition ij" are "attribute 1=attribute ij1", . . . , and "attribute n=attribute ijn" (the left-hand side is the attribute name; the right-hand side is the attribute value; n is an integer greater than or equal to 1).

With the management server 100 having the configuration described above, an operation procedure for system construction work to be performed on an arbitrary ICT system is automatically generated, based on the content of previous system construction work performed on the ICT systems 41 through 44.

Figure 9:
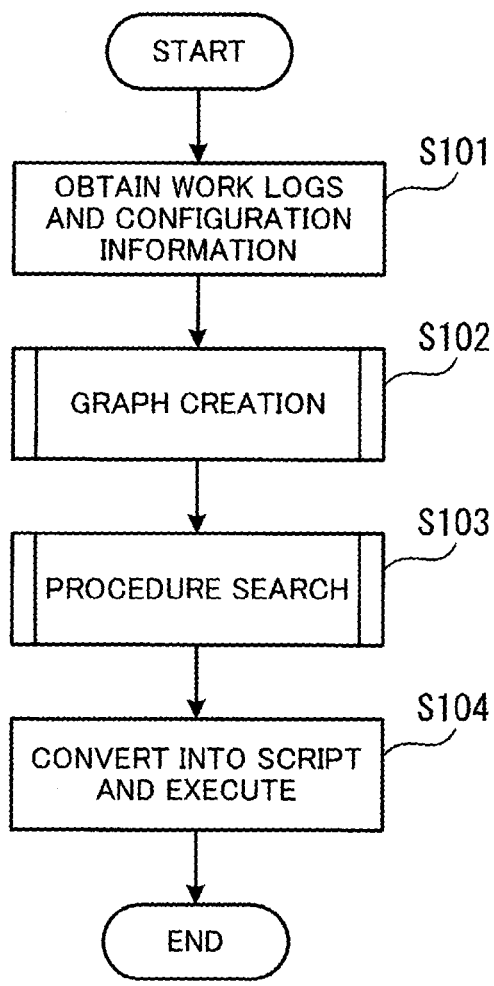
FIG. 9 is a flowchart illustrating the processing procedure of automatic generation of an operation procedure.

FIG. 9 is a flowchart illustrating the processing procedure of automatic generation of an operation procedure.

(Step S101) The information collection unit 120 collects work logs and configuration information pieces from the respective ICT systems 41 through 44. For example, the information collection unit 120 collects information in accordance with an information collection instruction from the user. When collecting information, the information collection unit 120 transmits an information provision request to the ICT systems 41 through 44, for example. In response to the information provision request, the information provision units 41a, 42a, 43a, and 44a of the ICT systems 41 through 44 transmits work logs and configuration information pieces stored in advance to the management server 100. The information collection unit 120 stores the collected work logs in the log database 130. Further, the information collection unit 120 stores the collected configuration information pieces in the CMDB 140.

(Step S102) The graph creation unit 160 creates a graph from the work logs 131, 132, and so on stored in the log database 130, based on preconditions or postconditions shared between operations. For example, the graph creation unit 160 creates a graph in accordance with a graph creation instruction from the user. The graph creation unit 160 may create a graph when the information collection unit 120 completes information collection. When creating a graph, the condition determination dictionary 151 in the condition determination dictionary memory 150 is referred to. The graph creation unit 160 stores the created graph in the graph database 170. This process will be described below in detail (see FIG. 10).

(Step S103) The procedure search unit 180 searches for an operation procedure for the operation object ICT system, from the graph stored in the graph database 170. For example, the procedure search unit 180 searches for an operation procedure in accordance with an operation procedure creation instruction from the user. The procedure search unit 180 transmits the operation procedure obtained by the search to the script execution unit 190. The procedure search process will be described below in detail (see FIG. 15).

(Step S104) The script execution unit 190 converts the received operation procedure into a script, and executes the script so as to remotely operate the operation object ICT system.

In this manner, it is possible to generate an operation procedure, and to operate the ICT system in accordance with the operation procedure.

The following describes the graph creation process in detail.

Figure 10:
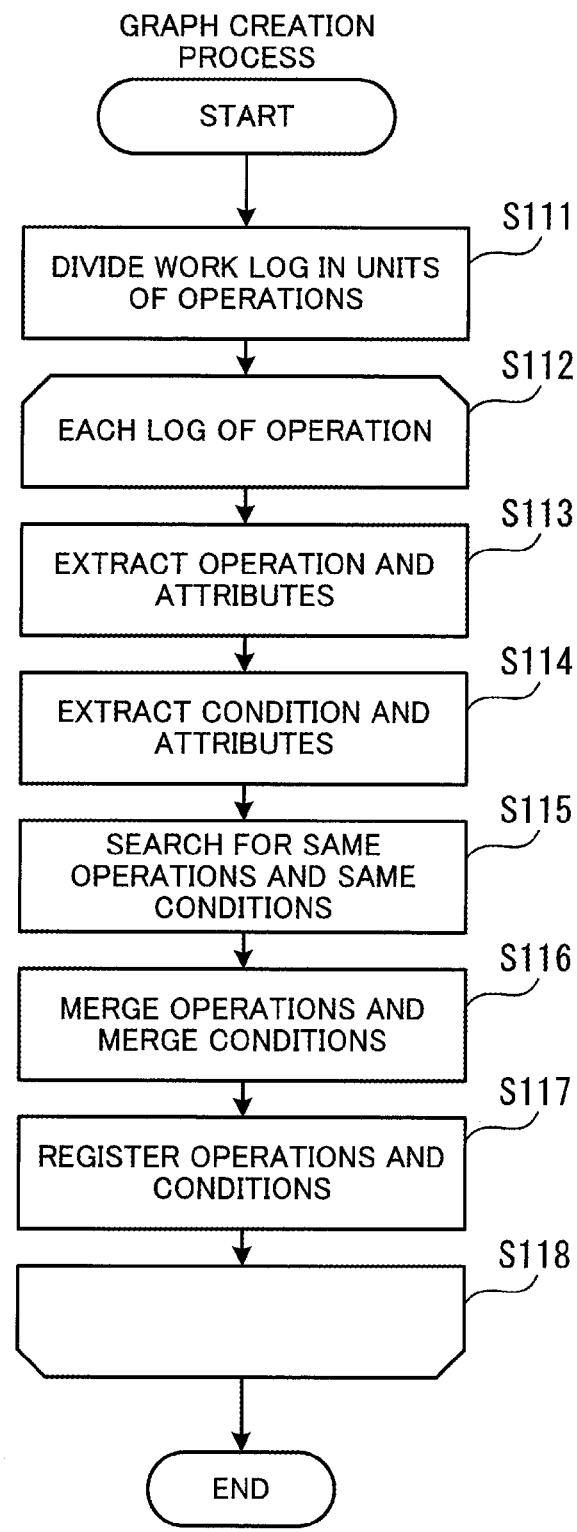
FIG. 10 is a flowchart illustrating an example of the procedure of a graph creation process.

FIG. 10 is a flowchart illustrating an example of the procedure of the graph creation process.

(Step S111) The graph creation unit 160 reads work logs from the log database 130, and divides each of the read work logs in units of operations. For example, in the case of the work logs 131, 132, and so on illustrated in FIG. 5, each work log is divided immediately above each description of an execve system call.

(Step S112) The graph creation unit 160 performs the processing of steps S113 through S117 described below for each of logs divided in units of operations, and thereby extracts operating conditions of operations.

(Step S113) The graph creation unit 160 analyzes the log of an operation, and extracts the operation and the attributes of the operation. For example, the graph creation unit 160 extracts a file path and an argument of a command executed by execve, from the log of the operation. The extracted string is an operation performed on the ICT system, and this string is set as the attribute indicating the name of the operation. Examples of the attributes of the operation extracted from the log of the operation include not only the name, but also the user who executed the operation, OS type, file path of the command, version of the command, size of the command, and hash of the command.

FIG. 11 illustrates an example of a method of obtaining the attributes of an operation. The attribute value of the attribute name "Name" is obtained by, for example, combining the file path and argument of the command. For example, in the case of the first operation of the work log 131 of FIG. 5, the attribute value indicating the name of the operation is "/usr/bin/yum [yum, install, mysql]".

The attribute value of the attribute name "Executed by" may be obtained by, for example, executing a command such as "whoami" or the like. For example, when executing processing corresponding to an operation, the information provision units 41a, 42a, 43a, and 44a of the ICT systems 41 through 44 obtain information on the user name of a process performing the operation and the like, by using a command such as "whoami" or the like. Then, the information provision units 41a, 42a, 43a, and 44a store the obtained information on the user and the like in the work log as the attribute value of the attribute name "Executed by". For example, an attribute value "root" is obtained.

The attribute value of the attribute name "OS Type" may be obtained by, for example, executing a command such as "uname -srvi" or the like. For example, when executing processing corresponding to an operation, the information provision units 41a, 42a, 43a, and 44a of the ICT systems 41 through 44 obtain the type of the OS controlling the processing corresponding to the operation, by using a command such as "uname -srvi" or the like. Then, the information provision units 41a, 42a, 43a, and 44a store the obtained type of the OS in the work log as the attribute value of the attribute name "OS Type". For example, an attribute value "Linux 2.6.32-358.23.2.e16.x86_64 #1 SMP Wed Oct 16 18:37:12 UTC 2013 x86_64" is obtained.

The attribute value of the attribute name "File Path of Command" may be obtained from, for example, the argument of the command indicated in the execve system call. For example, an attribute value "/usr/bin/yum" is obtained.

The attribute value of the attribute name "Version of Command" is the version of the command that is executed. For example, the version of a software package is set as the version of the command. The attribute value of the attribute name "Version of Command" may be obtained by, for example, executing a command such as "rpm -qa|grep command name" or the like. For example, when executing processing corresponding to an operation, the information provision units 41a, 42a, 43a, and 44a of the ICT systems 41 through 44 obtain the version of the command, by using "rpm -qa|grep command name" command or the like. Then, the information provision units 41a, 42a, 43a, and 44a store the obtained version of the command in the work log as the attribute value of the attribute name "Version of Command". For example, an attribute value "yum-3.2.29-40.el6.centos.noarch" is obtained.

The attribute value of the attribute name "Size of Command" may be obtained by, for example, executing a command such as "file path of ls -l command" or the like. For example, when executing processing corresponding to an operation, the information provision units 41a, 42a, 43a, and 44a of the ICT systems 41 through 44 obtain the size of the command, by using a command such as "file path of ls -l command" or the like. Then, the information provision units 41a, 42a, 43a, and 44a store the obtained size of the command in the work log as the attribute value of the attribute name "Size of Command". For example, an attribute value "801 Bytes" is obtained.

The attribute value of the attribute name "Hash of Command" may be obtained by, for example, executing a command such as "file path of md5sum command" or the like. For example, when executing processing corresponding to an operation, the information provision units 41a, 42a, 43a, and 44a of the ICT systems 41 through 44 obtain the hash of the command, by using a command such as "file path of md5sum command" or the like. Then, the information provision units 41a, 42a, 43a, and 44a store the obtained hash of the command in the work log as the attribute value of the attribute name "Hash of Command". For example, an attribute value "af3eaddb82d77ebb8eaa42e27f61b2ed" is obtained.

Now, FIG. 10 will be referred to again.

(Step S114) The graph creation unit 160 analyzes the log of the operation, and extracts a precondition of the operation and its attributes, and a postcondition of the operation and its attributes. For example, the graph creation unit 160 extracts a precondition and a postcondition from a log of an open system call. That is, a file is operated in the form of open ("file path", option). Thus, the graph creation unit 160 searches for a pattern that matches the option of the open system call from the condition determination dictionary 151 (see FIG. 7). Then, the graph creation unit 160 determines that the content of the open system call defines a condition corresponding to a pattern that matches the option.

Figure 12:
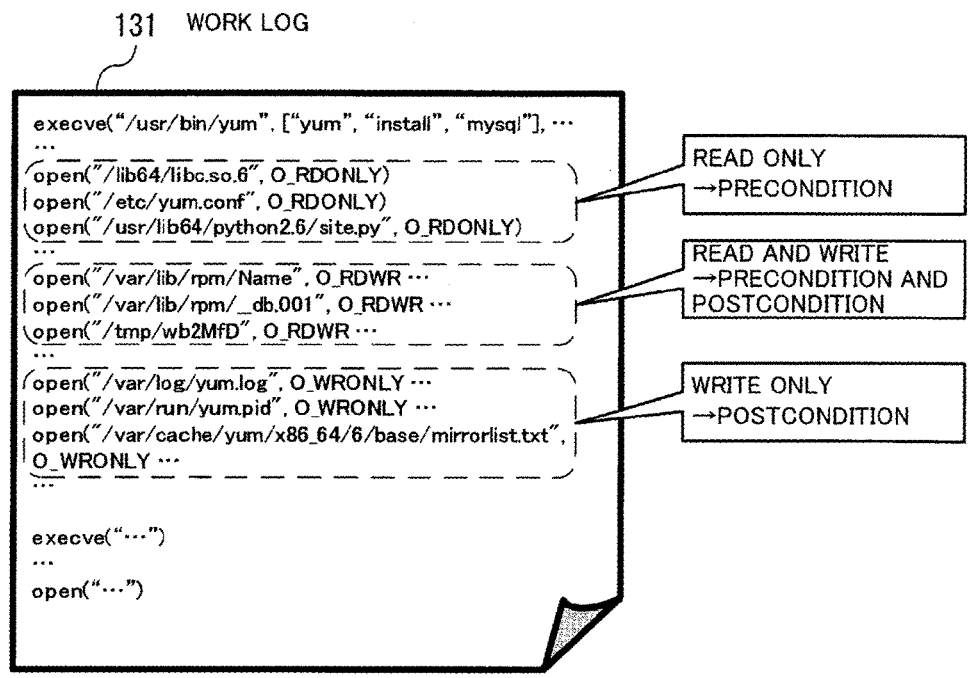
FIG. 12 illustrates an example of determining whether a condition is a precondition or a postcondition.

FIG. 12 illustrates an example of determining whether a condition is a precondition or a postcondition. When the option of the open system call is read-only (O_RDONLY), it indicates that the file to be read is the file that is used for this operation. Thus, the existence of the file before the operation is determined to be a precondition.

When the option of the open system call is write-only (O_WRONLY), it indicates that the file to be written is the file that is generated after this operation. Thus, the existence of the file after the operation is determined to be a postcondition.

When the option of the open system call is read and write (O_RDWR), the condition may be either read or write. In this case, the existence of a file to be read is determined to be a precondition, and the existence of the updated file after the operation is determined to be a postcondition.

Then, for these extracted conditions, their attributes are extracted.

FIG. 13 illustrates an example of a method of obtaining the attributes of a condition. The method illustrated in FIG. 13 is a method of obtaining the attributes of a file in the case where a condition on the file is defined.

The attribute value of the attribute name "Name" is the path (file path) of the file to be read or written by the open system call. For example, an attribute value "/lib64/libc-2.12.so" is obtained.

The attribute value of the attribute name "Owner" may be obtained from, for example, the result of "ls -l file path" or the like. For example, when executing processing corresponding to an operation, the information provision units 41a, 42a, 43a, and 44a of the ICT systems 41 through 44 obtain the name of the owner of the file, by using a command such as "file path of ls -l command" or the like. Then, the information provision units 41a, 42a, 43a, and 44a store the obtained name of the owner in the work log as the attribute value of the attribute name "Owner". For example, an attribute value "root" is obtained.

The attribute value of the attribute name "Group" may be obtained from, for example, the result of "ls -l file path" or the like. For example, when executing processing corresponding to an operation, the information provision units 41a, 42a, 43a, and 44a of the ICT systems 41 through 44 obtain the group name, by using a command such as "file path of ls -l command" or the like. Then, the information provision units 41a, 42a, 43a, and 44a store the obtained name of the group in the work log as the attribute value of the attribute name "Group". For example, an attribute value "root" is obtained.

The attribute value of the attribute name "Access Permission" may be obtained from, for example, the result of "ls -l file path" or the like. For example, when executing processing corresponding to an operation, the information provision units 41a, 42a, 43a, and 44a of the ICT systems 41 through 44 obtain an access permission to the file, by using a command such as "file path of ls -l command" or the like. Then, the information provision units 41a, 42a, 43a, and 44a store the obtained access permission in the work log as the attribute value of the attribute name "Access Permission". For example, an attribute value "0644" is obtained.

The attribute value of the attribute name "Size" may be obtained from, for example, the result of "ls -l file path" or the like. For example, when executing processing corresponding to an operation, the information provision units 41a, 42a, 43a, and 44a of the ICT systems 41 through 44 obtain the size of the file, by using a command such as "file path of ls -l command" or the like. Then, the information provision units 41a, 42a, 43a, and 44a store the obtained size in the work log as the attribute value of the attribute name "Size". For example, an attribute value "1916568 Bytes" is obtained.

The attribute value of the attribute name "Hash" may be obtained from, for example, the result of "file path of md5sum command" or the like. For example, when executing processing corresponding to an operation, the information provision units 41a, 42a, 43a, and 44a of the ICT systems 41 through 44 obtain the hash of the file, by using a command such as "file path of md5sum command" or the like. Then, the information provision units 41a, 42a, 43a, and 44a store the obtained hash in the work log as the attribute value of the attribute name "Hash". For example, an attribute value "f0dac9e070314da374calca29a1a4fdb" is obtained.

Now, FIG. 10 will be referred to again.

(Step S115) The graph creation unit 160 searches for the same operation as that extracted in step S113, from among the operations already stored in the graph database 170. The same operation is an operation all of whose attributes have the same attribute values as the attributes of the extracted operation, for example. Further, the graph creation unit 160 searches for the same condition as that extracted in step S114, from among the conditions already stored in the graph database 170. The same condition is a condition all of whose attributes have the same attribute values as the attributes of the extracted condition, for example.

(Step S116) The graph creation unit 160 merges the same operations and merges the same conditions. The term "merge" as used herein refers to, in the case of conditions, recognizing a plurality of conditions having the same attribute value for each of all the attributes, among the conditions registered in the existing graph database 170, as the same condition. Having the same attribute value for each of all the attributes means that if any one of the plurality of conditions has an attribute with an attribute name, the other conditions also have an attribute with the same attribute name, and the attributes having the same attribute name have the same attribute value. The same applies to operations. Thus, the graph creation unit 160 recognizes operations having the same attribute value for each of all the attributes as the same operation, and assigns these operations with the same operation ID.

In the example of FIG. 8, the condition ID "condition 12" of the operation ID "operation 1" and the condition ID "condition 12" of the operation ID "operation 2" are the same condition. For example, the graph creation unit 160 extracts the condition for the operation ID "operation 2" (the condition ID at the time of extraction is "condition X"). Then, the graph creation unit 160 searches the graph database 170 for a condition having the same attribute value for each of all the attributes as the extracted condition. If such a condition is found, the graph creation unit 160 replaces "condition X" with the condition ID of the found condition. In this way, it is possible to assign the same conditions with the same condition ID, and merge these conditions.

(Step S117) The graph creation unit 160 registers the operations and conditions after the merge in the graph database 170.

(Step S118) If the graph creation unit 160 completes the processing of steps S113 through step S117 for the logs of all the operations, the graph creation process ends.

In this manner, a graph representing the relationship between operations and conditions is stored in the graph database 170. The data structure of the graph is illustrated in FIG. 8. The graph is defined by data having the structure illustrated in FIG. 8. The graph defined in the graph database 170 is one generated by combining graphs of respective operations through merging of operations and conditions.

Figure 14:
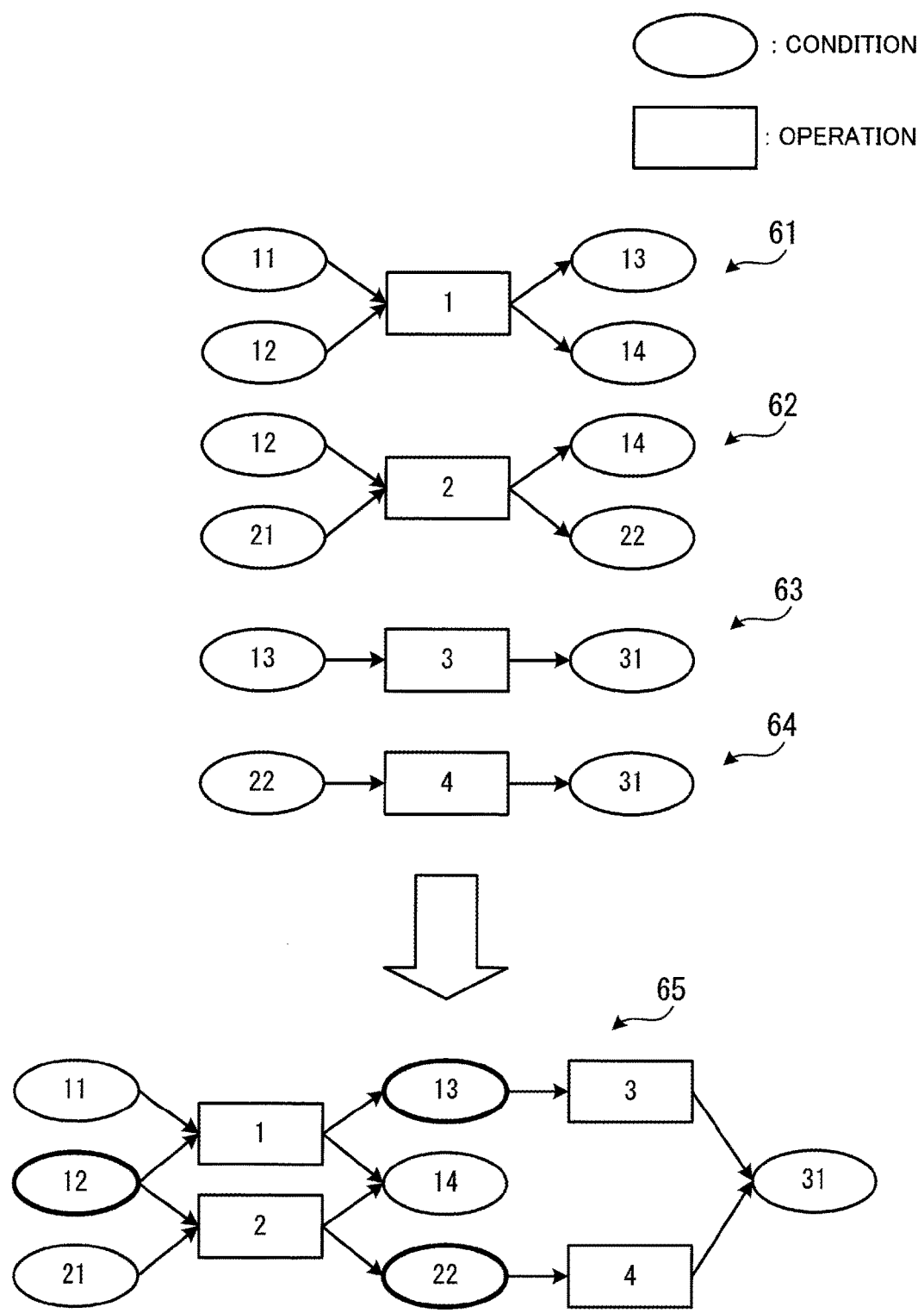
FIG. 14 illustrates an example of a merge process.

FIG. 14 illustrates an example of a merge process. In the case where there are four operations as illustrated in the operation table 171 (see FIG. 8) of the graph database 170, graphs 61 through 64 of the respective operations may be created. Each of the graphs through 64 is represented by a combination of nodes and edges. A node is an element representing an operation or a condition. An edge is an arrow connecting nodes, and represents the relationship between the nodes.

In the example of FIG. 14, each operation is represented by a rectangular node, and each condition is represented by an ellipsoidal node. In a node representing an operation, the operation ID of the operation is indicated. In a node representing a condition, the condition ID of the condition is indicated. A node of a precondition is located at the left of a node of an operation, and a node of a postcondition is located at the right of the node of the operation. The nodes of the precondition and postcondition of the operation are connected to the node of the operation by edges. The arrow representing the edge connecting the node of the precondition and the node of the operation is pointing at the node of the operation. The arrow representing the edge connecting the node of the operation and the node of the postcondition is pointing at the node of the postcondition.

Among the graphs 61 through 64 of the respective operations, if there are the same operations or the same conditions, the operations or the conditions are merged into one node. By merging the same operations or the same conditions, the graphs 61 through 64 of the respective operations are combined into one graph 65. In the graph 65, the node with the condition ID "condition 12" as a precondition of the operation with the operation ID "operation 1" and the node with the condition ID "condition 12" as a precondition of the operation with the operation ID "operation 2" are merged into one node. Further, the node with the condition ID "condition 13" as a postcondition of the operation with the operation ID "operation 1" and the node with the condition ID "condition 13" as a precondition of the operation with the operation ID "operation 3" are merged into one node. Further, the node with the condition ID "condition 22" as a postcondition of the operation with the operation ID "operation 2" and the node with the condition ID "condition 22" as a precondition of the operation with the operation ID "operation 4" are merged into one node.

Using the graph 65 that is combined in this way, a procedure search may be performed.

The following describes the procedure search process in detail. The procedure search process is executed when a procedure search instruction specifying an initial condition and a target condition is input from the user, for example. The initial condition indicates the current configuration of the operation object ICT system. The initial condition is a collection of conditions on the system configuration, and the operation object ICT system satisfies all the conditions included in the initial condition. For example, if a file is defined as the initial condition, a file satisfying the attribute values of the initial condition is present in the operation object ICT system. The target condition indicates the system configuration to be built on the operation object ICT system. The target condition is a collection of conditions on the system configuration. A procedure that makes the operation object ICT system satisfy all the conditions included in the target condition is searched for.

Note that the procedure search unit 180 may automatically generate the initial condition based on the configuration information piece collected from the operation object ICT system, for example. Also, the procedure search unit 180 may receive information specifying an ICT system having a configuration close to the target configuration, and automatically generate the target condition, based on the configuration information piece collected from the specified ICT system.

Figure 15:
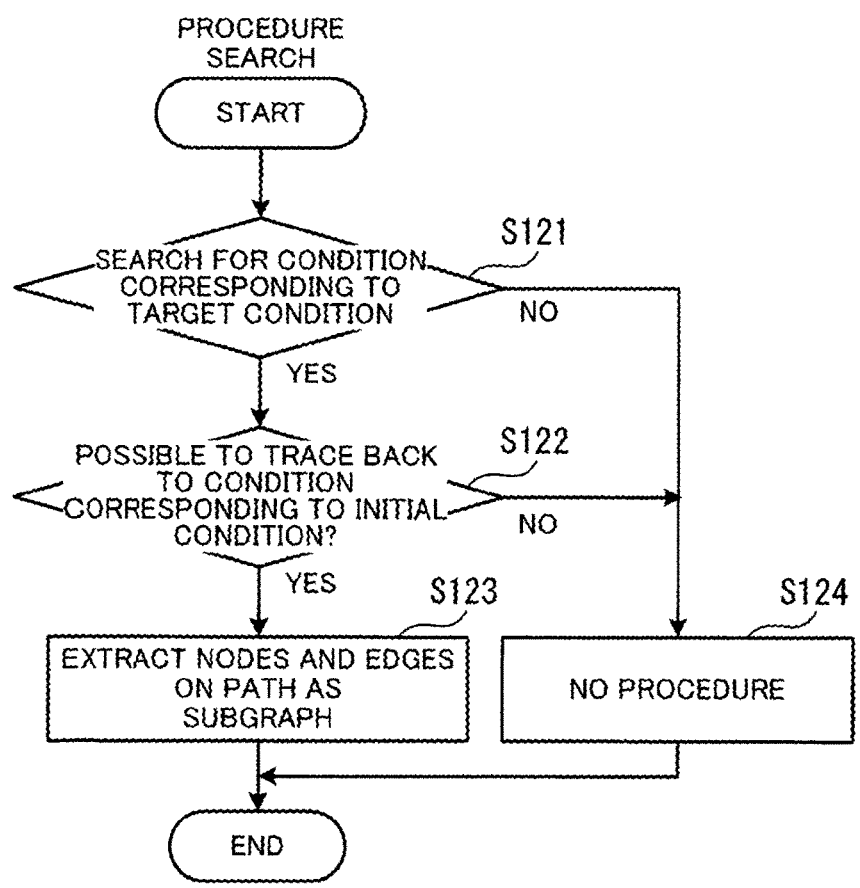
FIG. 15 is a flowchart illustrating an example of the processing procedure of procedure search.

FIG. 15 is a flowchart illustrating an example of the processing procedure of procedure search.

(Step S121) The procedure search unit 180 searches for a condition corresponding to the target condition, from the graph stored in the graph database 170. For example, the procedure search unit 180 searches for a condition including the target condition from among the conditions in the graph. If there is such a condition, the process proceeds to step S122. If there is no such condition, the process proceeds to step S124.

(Step S122) When a condition corresponding to the target condition is found, the procedure search unit 180 determines whether it is possible to trace back from the condition corresponding to the target condition to the condition corresponding to the initial condition along the edges of the graph. In this step, the procedure search unit 180 searches only among conditions and operations whose attributes match the configuration of the operation object ICT system, for example. That is, when tracing an edge of the graph, the procedure search unit 180 refers to the attributes of a condition or an operation corresponding to a node connected by the edge, and traces the edge only when the state of the operation object ICT system meets the attributes of the operation. Further, as for nodes of operations in the graph, if all the preconditions of an operation are included in the initial condition or match the postconditions of an operation on a path connected to a condition corresponding to the initial condition, it is possible to trace the edge connected to the node of the operation. If it is possible to trace back to the condition corresponding to the initial condition, the process proceeds to step S123. If it is not possible to trace back to the condition corresponding to the initial condition, the process proceeds to step S124.

(Step S123) When it is possible to trace back to the initial condition, the procedure search unit 180 extracts, from the graph, nodes and edges on the path from the condition corresponding to the target condition to the condition corresponding to the initial condition as a subgraph. The extracted subgraph represents the operation procedure. Then, the procedure search process ends.

(Step S124) If a condition corresponding to the target condition is not found, or if a corresponding condition is found but it is not possible to trace back from the found condition to a condition corresponding to the initial condition, the procedure search unit 180 determines that no procedure is found. Then, the process ends.

In this way, a subgraph connecting the initial condition to the target condition is searched for.

In the example of FIG. 15, a search is performed by tracing back from the target condition to the initial condition. However, a search may be performed from the initial condition to the target condition. For example, the procedure search unit 180 specifies the node of an operation all of whose preconditions are included in the initial condition as a source operation, and determines whether an operation whose precondition matches the postcondition of the source operation is executable. An operation is executable if its precondition is included in the initial condition or a postcondition of an already traced operation on the path, and if the state represented by each of the attributes of the operation and the attributes of the precondition of the operation is satisfied by the operation object ICT system. If an executable operation is found, the procedure search unit 180 searches for the next operation in the direction from the found operation toward the target condition. Thus, it is possible to perform a search from the initial condition to the target condition.

Figure 16:
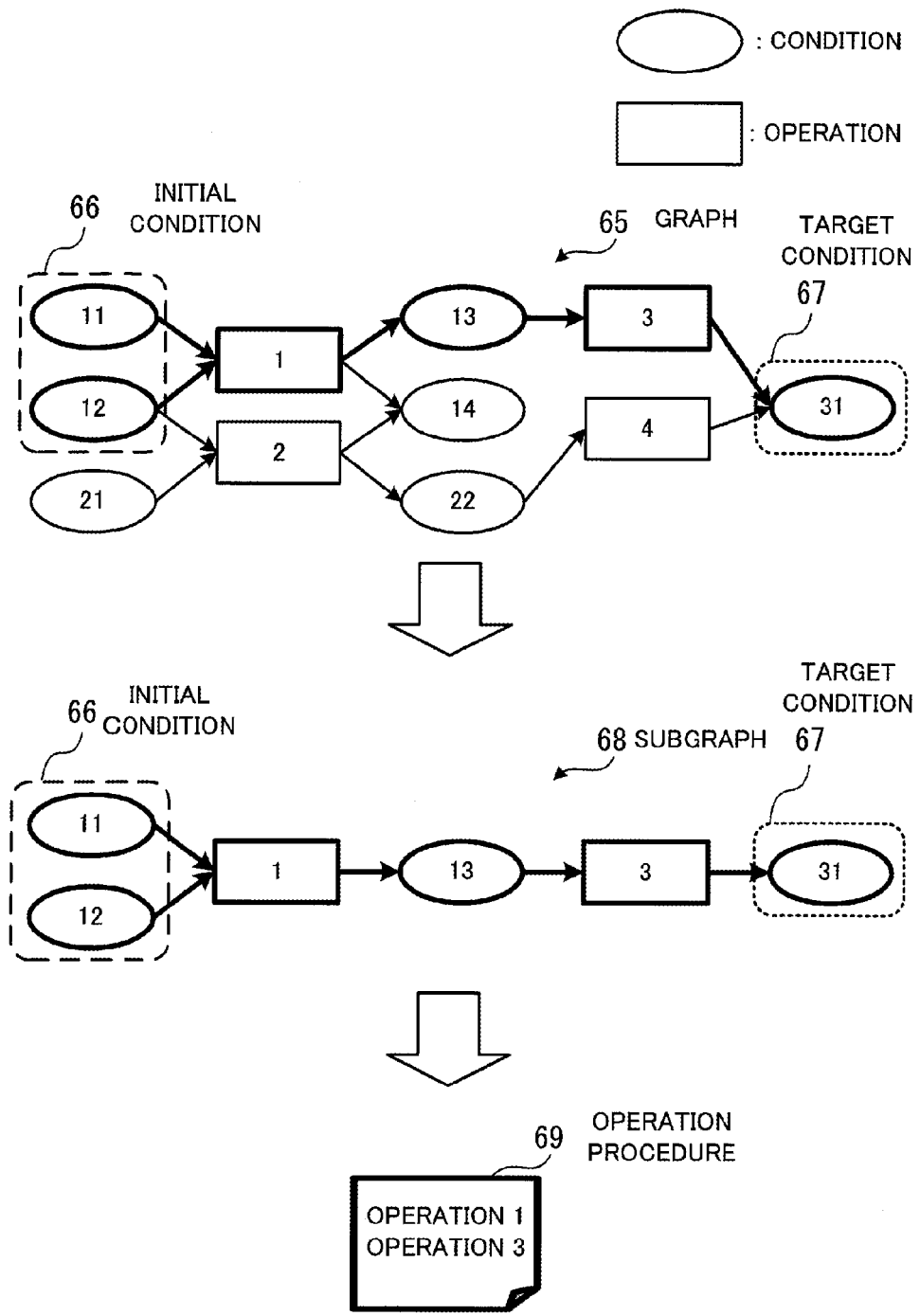
FIG. 16 illustrates an example of procedure search.

FIG. 16 illustrates an example of procedure search. In the example of FIG. 16, it is supposed that a procedure is searched for in the graph 65 illustrated in FIG. 14. Then, the conditions with the condition IDs "condition 11" and "condition 12" are given as the initial condition, and the condition with the condition ID "condition 31" is given as the target condition. Further, as the conditions on the operation object ICT system, the attributes and attribute values of an operation such as "Executed by: root" are given. Here, the attributes of all the operations with the operation IDs "operation 1" through "operation 4" are satisfied by the operation object ICT system.

When a search condition is input, the target condition is searched for in the graph 65. In the graph 65, a condition (condition ID "condition 31") corresponding to a target condition 67 is present.

Then, a determination is made whether it is possible to trace back from the condition corresponding to the target condition 67 to the initial condition in the graph 65. In the graph 65, conditions (condition IDs "condition 11" and "condition 12") corresponding to an initial condition 66 are present. Then, the nodes corresponding to the initial condition 66 and the node corresponding to the target condition 67 are connected via the nodes with the operation ID "operation 1", the condition ID "condition 13", and the operation ID "operation 3". The operations and conditions on the path are satisfied by the operation object ICT system. Then, the nodes and edges on the path found by the search are extracted, so that a subgraph 68 is generated.

The precondition of each operation in the subgraph 68 needs to be the initial condition or a postcondition of an operation that is executable before the operation. For example, when tracing back from the node with the condition ID "condition 31" in the graph 65, there is a path that traces the nodes with the operation ID "operation 4", the condition ID "condition 22", the operation ID "operation 2", and the condition ID "condition 12". However, the condition ID "condition 21" as the precondition of the operation ID "operation 2" is not satisfied as the initial condition and is not the postcondition of an executable operation. Therefore, it is not possible to select the node with the condition ID "condition 21", and the path that passes through this node is excluded from the subject of search.

In the example of FIG. 16, only one target condition is provided for ease of illustration. However, if there are a plurality of target conditions, the procedure search unit 180 performs a procedure search for each of the target conditions. Then, the procedure search unit 180 combines subgraphs of the respective target conditions by merging the same operations or the same conditions.

The subgraph 68 generated by the procedure search unit 180 represents an operation procedure 69 for the operation object ICT system. The script execution unit 190 generates a script, based on the subgraph 68. For example, the script execution unit 190 arranges operations included in the extracted subgraph 68 such that operations closer to the initial conditions are executed earlier. That is, if there is an operation C whose postcondition matches a precondition B of an operation A, the script execution unit 190 arranges the operations such that the operation C is executed earlier. Examples of such an operation arrangement method include a topological sort and the like.

In this manner, a script including a sequence of operations is generated. In the example of FIG. 16, a script describing a procedure that executes the operation with the operation ID "operation 1" and then executes the operation with the operation ID "operation 3" is generated.

As described above, according to the second embodiment, it is possible to generate an operation procedure by dividing an operation procedure of previously-performed work into segments in units of operations and reusing the divided segments. That is, it is possible to reuse an operation procedure in small granularity, in units of segments of the procedure (in units of operations). Thus, even in the case where an event that matches the search condition is not found from a large procedure such as one describing the entire previous work, it is possible to generate an operation procedure that matches the search condition by combining the individual operations. As a result, it is possible to generate an operation procedure in more situations, which increases the rate of reuse of previous procedures. Thus, man-hours of work are reduced.

Further, in the second embodiment, when searching for an operation procedure, the operation procedure is searched for only among operations and conditions applicable to the operation object system. Thus, if operations are performed in accordance with the created operation procedure, it is guaranteed that it is possible to change the configuration of the operation object system as intended. This eliminates the need for the developer to check the operation procedure, and thus reduces man-hours of work.

(c) Third Embodiment

Next, a description will be given of a third embodiment. According to the third embodiment, even if the expected operation result is not obtained in the operation object ICT system, it is possible to change the configuration of the operation object ICT system to meet the target condition.

When introducing software into a computer system or updating the software, an unexpected result may occur. For example, even if the same operation is performed, different results may be obtained due to the difference in version of the software that is beyond management. This means that, even if the same operation is performed by reusing operations indicated in a previous work log, the operation object ICT system may not satisfy the postcondition of the operation. Therefore, even if a script such as one described in the second embodiment is executed on the operation object ICT system, the ICT system might not satisfy the target condition.

In view of the above, in the third embodiment, each time the first operation of an operation procedure obtained by a procedure search is executed, the graph is updated in accordance with the latest state of the operation object ICT system, and a procedure search is performed again. Thus, even if the result of the operation is an unexpected one, it is possible to change the configuration of the operation object ICT system to meet the target condition.

Figure 17:
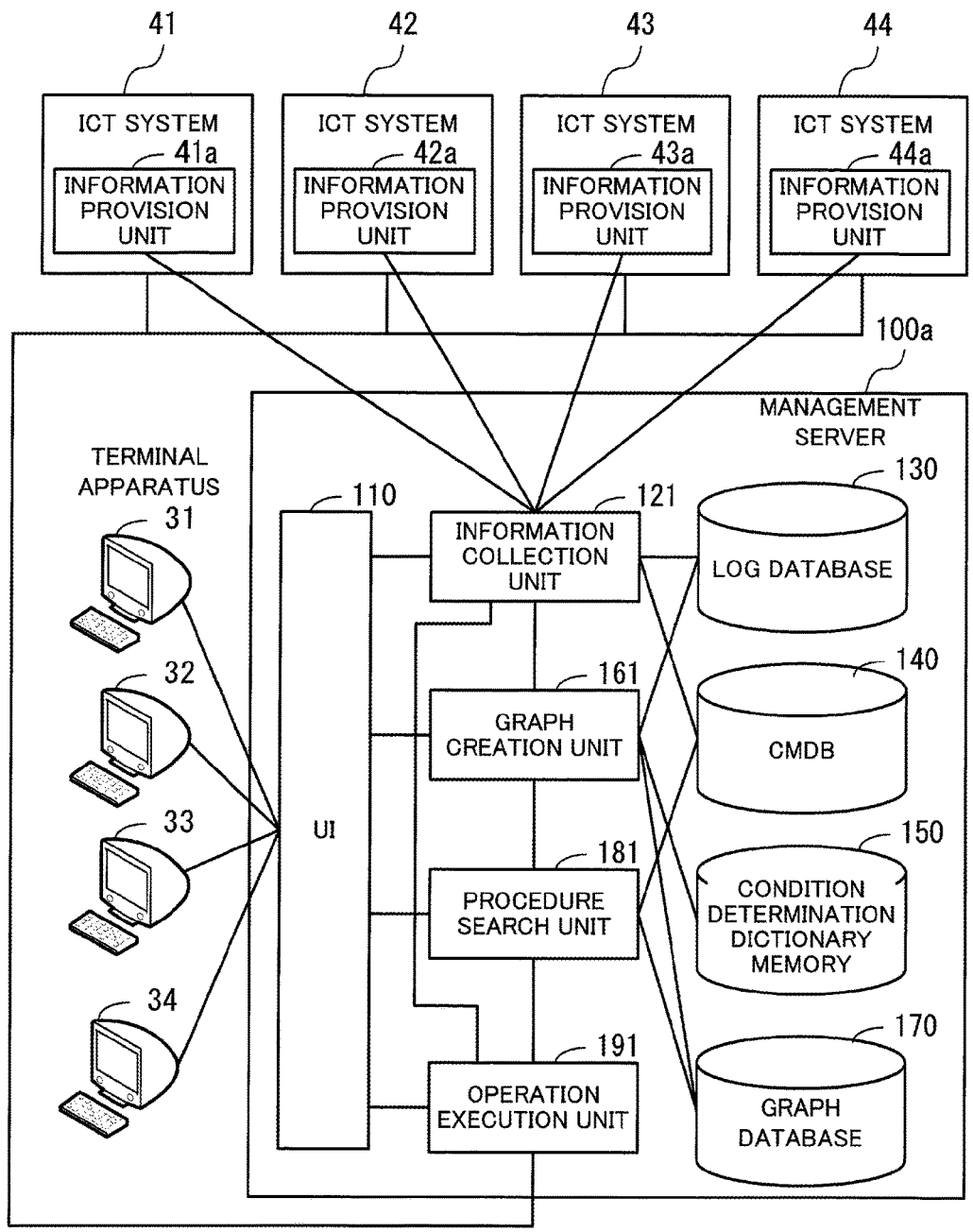
FIG. 17 illustrates an exemplary configuration of ICT systems according to a third embodiment.

FIG. 17 illustrates an exemplary configuration of ICT systems according to the third embodiment. Among elements illustrated in FIG. 17, elements corresponding to those of the second embodiment illustrated in FIG. 4 are denoted by the same reference numerals, and a description thereof will be omitted.

A management server 100*a* of the third embodiment includes a user interface 110, an information collection unit 121, a log database 130, a CMDB 140, a condition determination dictionary memory 150, a graph creation unit 161, a graph database 170, a procedure search unit 181, and an operation execution unit 191. When the procedure search unit 181 finds an operation procedure, the operation execution unit 191 executes the first operation of the operation procedure on the operation object ICT system.

Each of the information collection unit 121, the graph creation unit 161, the graph database 170, and the procedure search unit 181 has the following functions in addition to the functions of the element of the second embodiment having the same name. Each time the operation execution unit 191 executes an operation on the operation object ICT system, the information collection unit 121 obtains the content of the changes to the configuration of the ICT system that are made by the operation, and updates the content of the log database 130 and the CMDB 140. Each time the content of the log database 130 and the CMDB 140 is updated, the graph creation unit 161 creates a graph, and updates a graph stored in the graph database 170. Each time the graph is updated, the procedure search unit 181 searches for an operation procedure from the updated graph.

Note that the lines connecting the elements in FIG. 17 represent some of communication paths. Communication paths other than those of FIG. 17 may be provided. Further, the functions of each element illustrated in FIG. 17 may be realized by, for example, causing a computer to execute a program module corresponding to the element.

Figure 18:
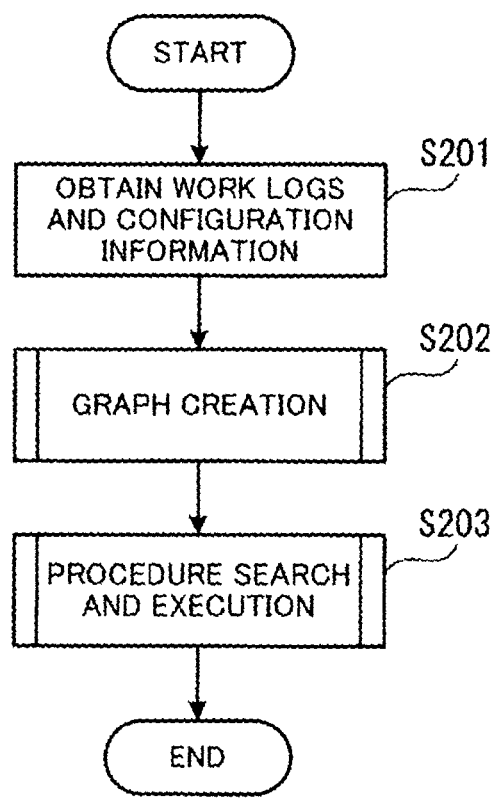
FIG. 18 is a flowchart illustrating an example of an automatic generation process of an operation procedure according to the third embodiment.

FIG. 18 is a flowchart illustrating an example of an automatic generation process of an operation procedure according to the third embodiment. Among the processing illustrated in FIG. 18, the processing of steps S201 and S202 are the same as the processing of steps S101 and S102 of the second embodiment illustrated in FIG. 9.

(Step S203) When a graph is created in the same manner as in the second embodiment, the information collection unit 121, the graph creation unit 161, the graph database 170, the procedure search unit 181, and the operation execution unit 191 perform a procedure search and execution process in cooperation with each other. In the procedure search and execution process, each time the first operation of the operation procedure found by the search is executed, creation of a graph and search for a procedure are repeated.

Figure 19:
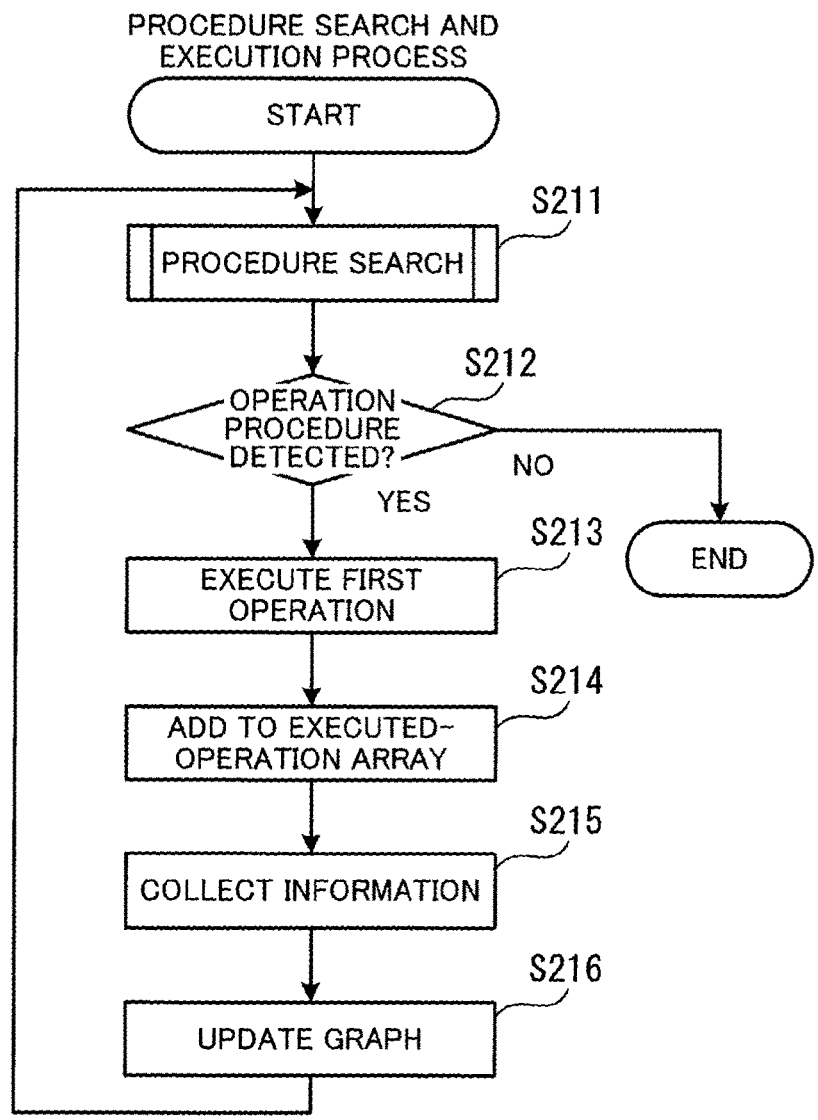
FIG. 19 is a flowchart illustrating an example of the procedure of a procedure search and execution process.

FIG. 19 is a flowchart illustrating an example of the procedure of the procedure search and execution process.

(Step S211) The procedure search unit 181 searches for an operation procedure for changing the latest configuration of the operation object ICT system to satisfy the target condition, based on the graph stored in the graph database 170. The detailed procedure of the procedure search process is the same as that of the process described in FIG. 15. Note that the procedure search unit 181 generates the initial condition at the time of procedure search, based on the latest configuration of the operation object ICT system stored in the CMDB 140.

(Step S212) The procedure search unit 181 determines whether an operation procedure is detected by the search. For example, if a condition corresponding to the target condition is satisfied by the latest state of the operation object ICT system, no operation procedure is detected. If an operation procedure is detected, the operation procedure is transmitted to the operation execution unit 191, and the process proceeds to step S213. If no operation procedure is detected, the process ends.

(Step S213) The operation execution unit 191 executes the first operation of the operation procedure detected by the search, with respect to the operation object ICT system. Then, the operation execution unit 191 reports the execution of the operation to the information collection unit 121 and the procedure search unit 181.

(Step S214) The procedure search unit 181 adds the operation executed by the operation execution unit 191 to an executed-operation array. The executed-operation array is a list in which operations executed on the operation object ICT system are arranged in order of execution. The executed-operation array is stored in, for example, a storage area of the memory 102 managed by the procedure search unit 181.

(Step S215) The information collection unit 121 obtains a configuration information piece of the operation object ICT system after execution of the operation by the operation execution unit 191 and a work log, from the operation object ICT system. The information collection unit 121 updates the work log related to the operation object ICT system in the log database 130, based on the obtained work log. Further, the information collection unit 121 updates the configuration information piece related to the operation object ICT system in the CMDB 140, based on the obtained configuration information piece. When the update of the information piece is completed, the information collection unit 121 reports the completion of the update to the graph creation unit 161.

(Step S216) The graph creation unit 161 updates the graph, based on the updated work log. For example, if a postcondition of an operation newly executed on the operation object ICT system is not included in the graph created before the operation, the graph creation unit 161 adds a node corresponding to the postcondition to the graph. The graph creation unit 161 stores the updated graph in the graph database 170. When the update of the graph is completed, the graph creation unit 161 reports the completion of the update of the graph to the procedure search unit 181. Then, the process returns to step S211.

With this procedure, even if the result of execution of an operation on the operation object ICT system is different from the expected result, it is possible to perform an operation on the ICT system such that the configuration of the ICT system satisfies the target condition.

The following describes a specific example of operation with reference to FIGS. 20 through 27.

Figure 20:
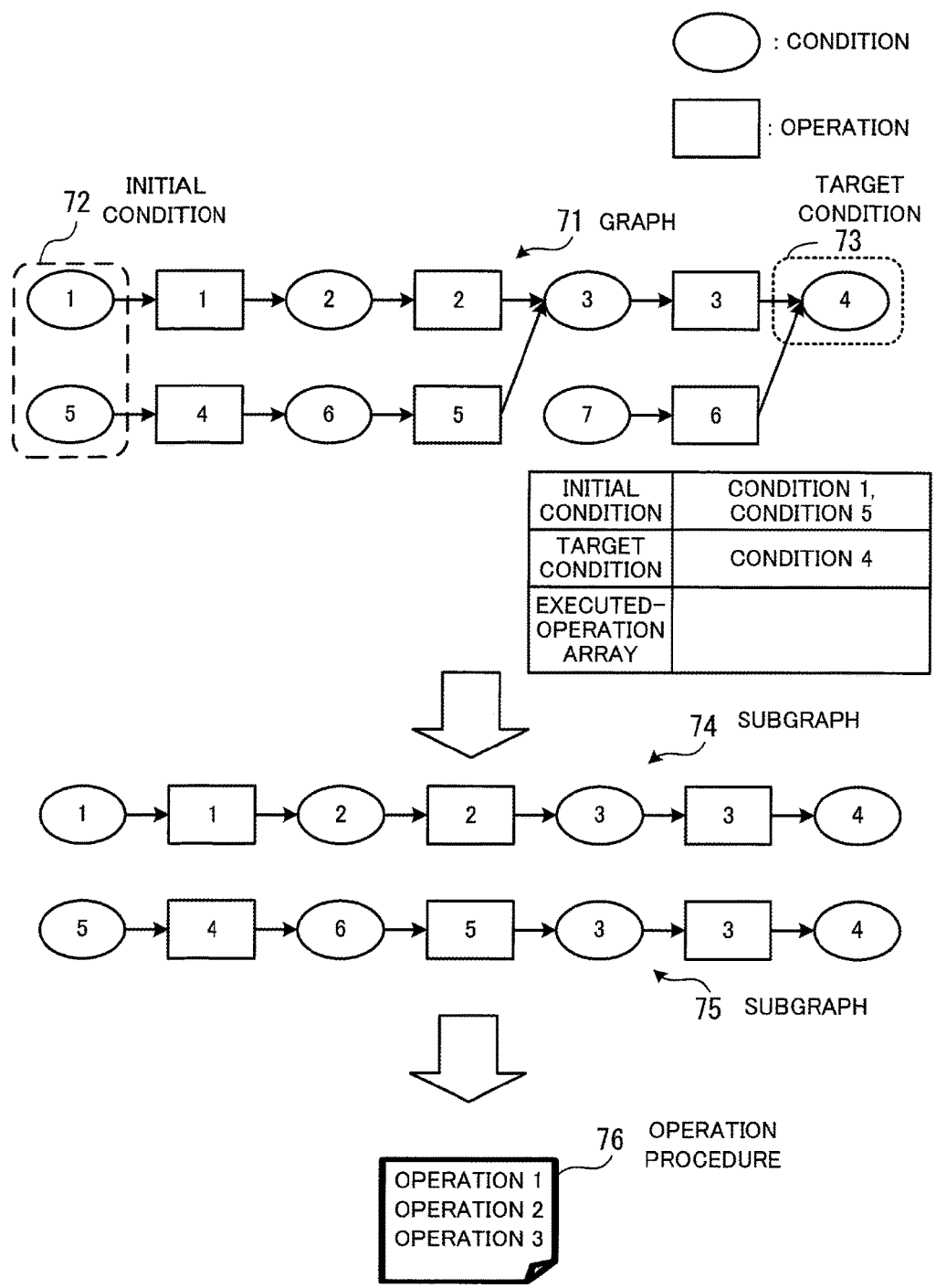
FIG. 20 is a first diagram illustrating an example of procedure search according to the third embodiment.

FIG. 20 is a first diagram illustrating an example of procedure search according to the third embodiment. It is supposed that, when the conditions with the condition IDs "condition 1" and "condition 5" are specified as an initial condition 72, and a condition with the condition ID "condition 4" is specified as a target condition 73, a graph 71 illustrated in FIG. 20 is generated. When an operation procedure is searched for in the graph 71, two subgraphs 74 and 75 are obtained. That is, there are two operation procedures that change the configuration of the operation object ICT system to satisfy the target condition. In this case, the procedure search unit 181 creates an operation procedure based on either one of the subgraphs. In the example of FIG. 20, an operation procedure 76 based on the subgraph 74 is generated. The operation procedure 76 indicates that the operations corresponding to the operation IDs "operation 1", "operation 2", and "operation 3" are executed sequentially.

Figure 21:
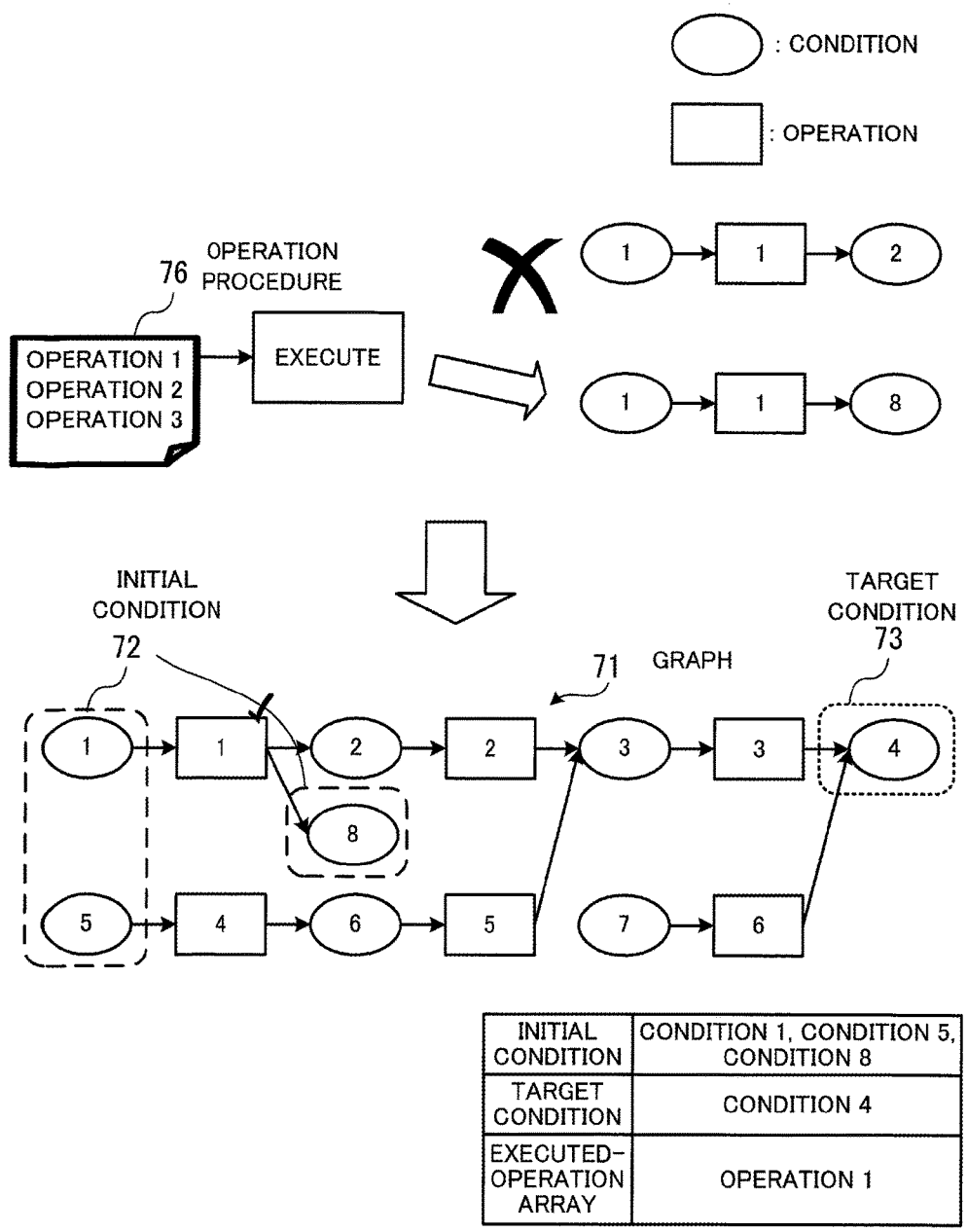
FIG. 21 is a second diagram illustrating the example of procedure search according to the third embodiment.

FIG. 21 is a second diagram illustrating the example of procedure search according to the third embodiment. When the operation procedure 76 is created, the operation execution unit 191 executes the first operation (operation ID "operation 1") of the operation procedure 76 on the operation object ICT system. According to the graph 71, the configuration of the operation object ICT system is expected to satisfy the condition with the condition ID "condition 2" in response to this operation. However, there may be a case in which the expected operation result is not obtained. In the example of FIG. 21, as a result of execution of the operation with the operation ID "operation 1", the configuration of the operation object ICT system has satisfied another condition (condition ID "condition 8"), instead of the condition with the condition ID "condition 2".

When information is collected from the operation object ICT system after the operation, it is found from the work log that as a postcondition of the operation with the operation ID "operation 1", the condition with the condition ID "condition 8" is generated. Then, the graph creation unit 161 adds a node corresponding to the condition with the condition ID "condition 8" to the graph 71. Further, it is found from the latest configuration information piece collected from the operation object ICT system that the ICT system has satisfied the condition with the condition ID "condition 8". Thus, the procedure search unit 181 adds the condition with the condition ID "condition 8" to the initial condition. Further, the procedure search unit 181 registers the operation ID "operation 1" of the operation executed by the operation execution unit 191 in the executed-operation array.

Figure 22:
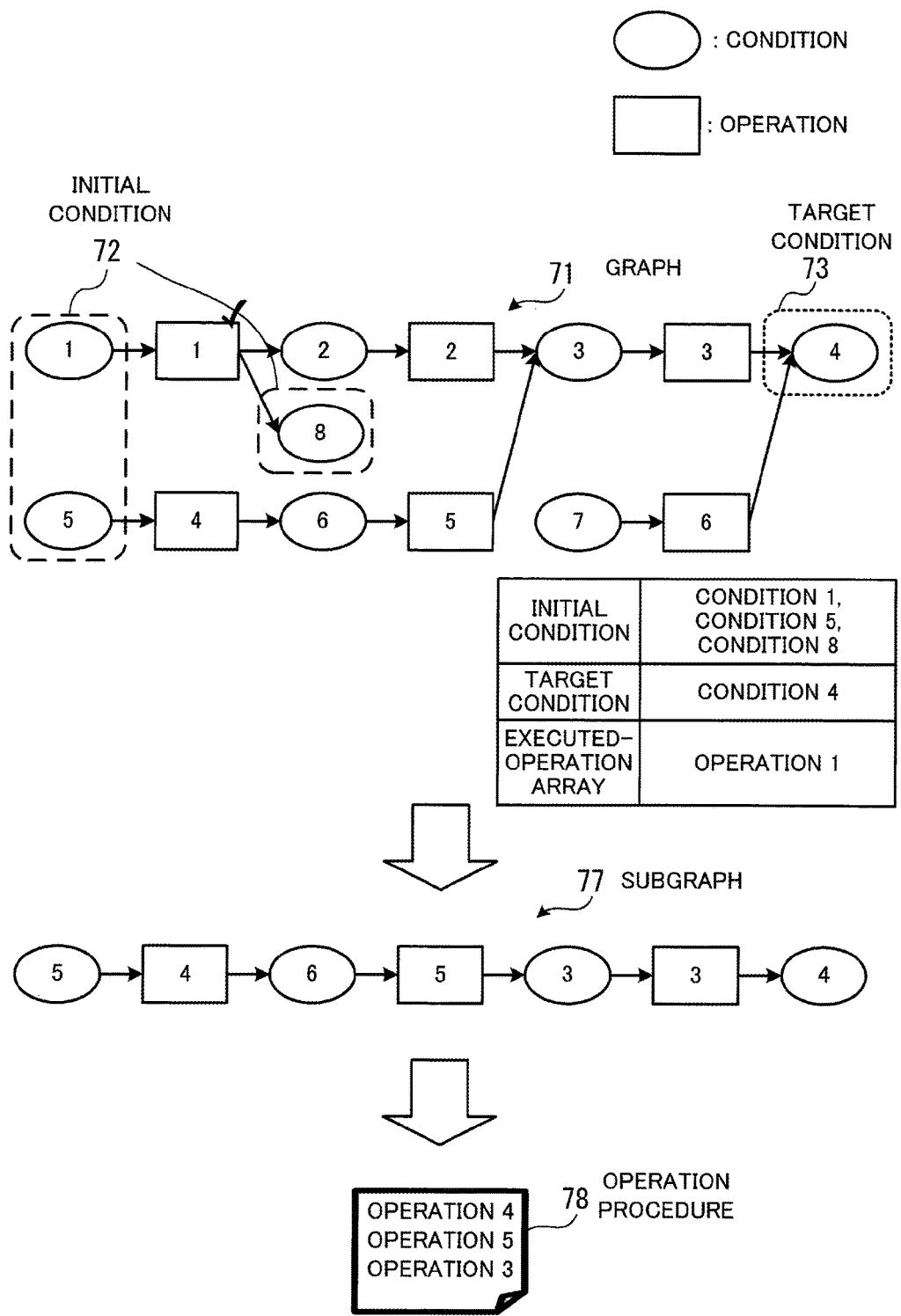
FIG. 22 is a third diagram illustrating the example of procedure search according to the third embodiment.

FIG. 22 is a third diagram illustrating the example of procedure search according to the third embodiment. An operation procedure is searched for based on the graph 71 after the update. In this step, the operation already executed is excluded from the subject of search. As a result, a subgraph 77 is obtained. Then, based on the subgraph 77, an operation procedure 78 is created. The operation procedure 78 indicates that the operations corresponding to the operation IDs "operation 4", "operation 5", and "operation 3" are executed sequentially.

Figure 23:
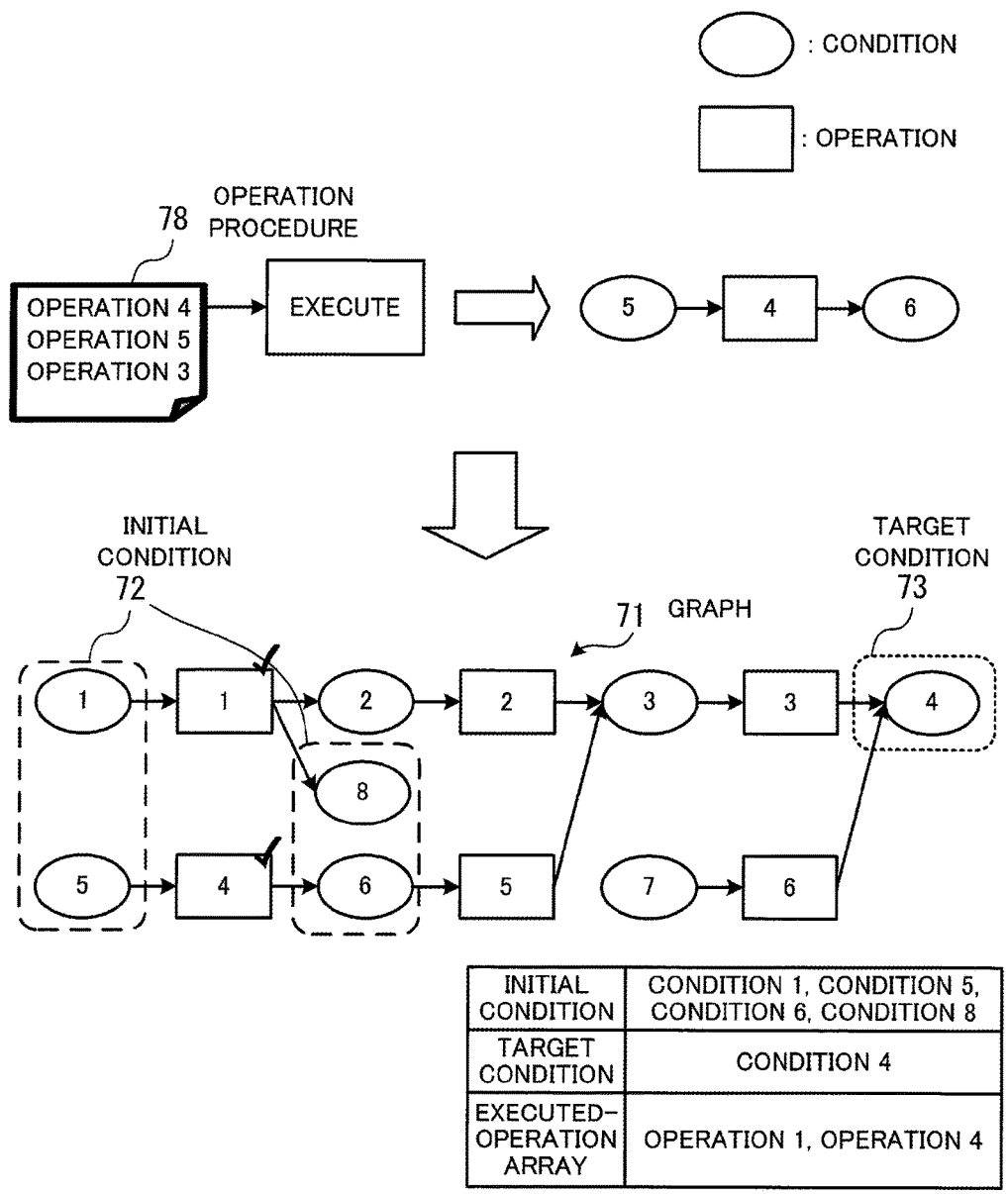
FIG. 23 is a fourth diagram illustrating the example of procedure search according to the third embodiment.

FIG. 23 is a fourth diagram illustrating the example of procedure search according to the third embodiment. When the operation procedure 78 is created, the operation execution unit 191 executes the first operation (operation ID "operation 4") of the operation procedure 78 on the operation object ICT system. According to the graph 71, the configuration of the operation object ICT system is expected to satisfy the condition with the condition ID "condition 6" in response to this operation. In the example of FIG. 23, as a result of execution of the operation with the operation ID "operation 4", the configuration of the operation object ICT system has satisfied the condition with the condition ID "condition 6" as expected.

When information is collected from the operation object ICT system after the operation, it is found from the work log that as a postcondition of the operation with the operation ID "operation 4", the condition with the condition ID "condition 6" is generated. This condition is already included in the graph 71, and therefore the graph 71 is not updated. Further, it is found from the latest configuration information piece collected from the operation object ICT system that the ICT system has satisfied the condition with the condition ID "condition 6". Thus, the procedure search unit 181 adds the condition with the condition ID "condition 6" to the initial condition. Further, the procedure search unit 181 registers the operation ID "operation 4" of the operation executed by the operation execution unit 191 in the executed-operation array.

Figure 24:
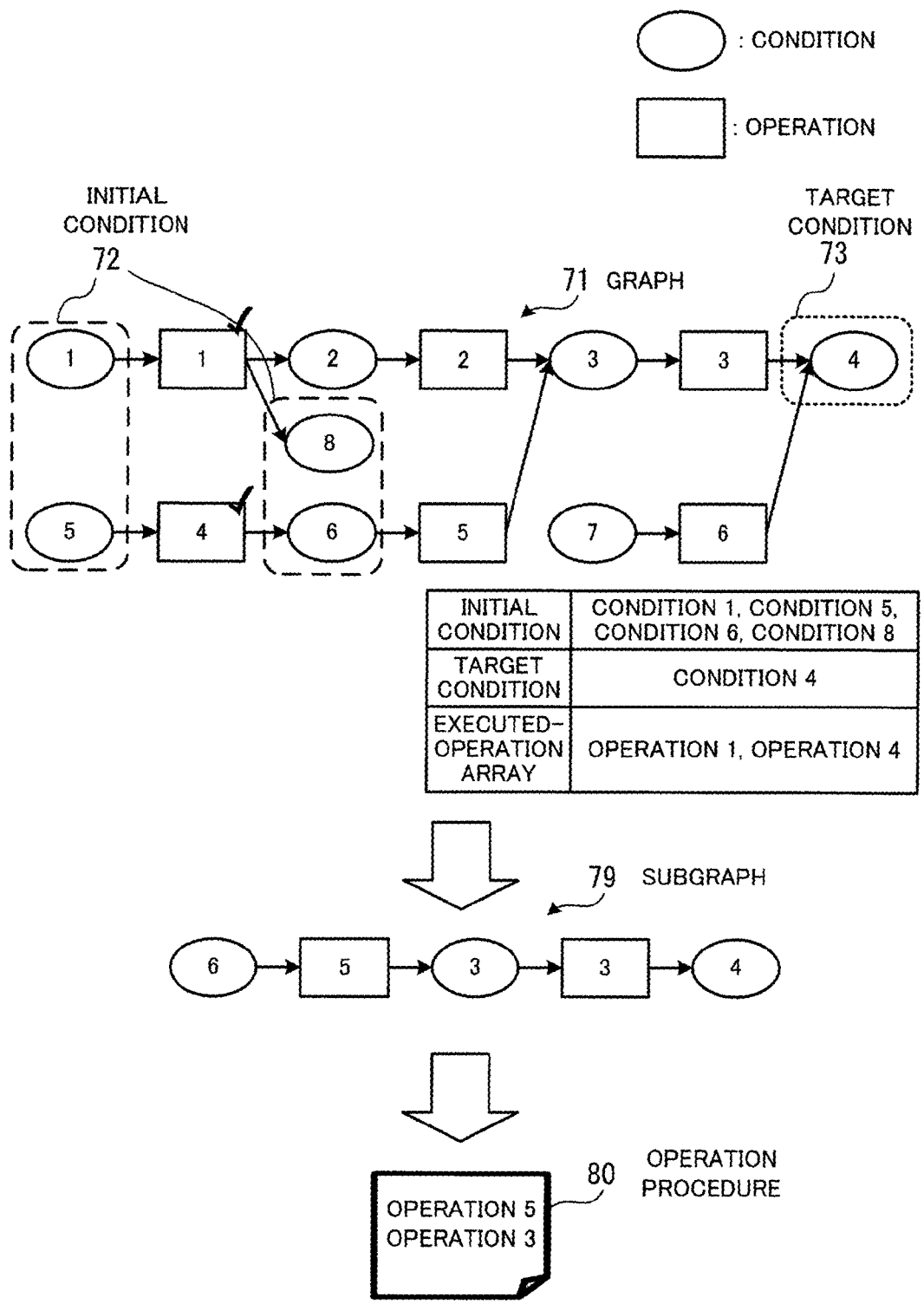
FIG. 24 is a fifth diagram illustrating the example of procedure search according to the third embodiment.

FIG. 24 is a fifth diagram illustrating the example of procedure search according to the third embodiment. An operation procedure is searched for based on the graph 71 after the second update. In this step, operations already executed are excluded from the subject of search. As a result, a subgraph 79 is obtained. Then, based on the subgraph 79, an operation procedure 80 is created. The operation procedure 80 indicates that the operations corresponding to the operation IDs "operation 5" and "operation 3" are executed sequentially.

Figure 25:
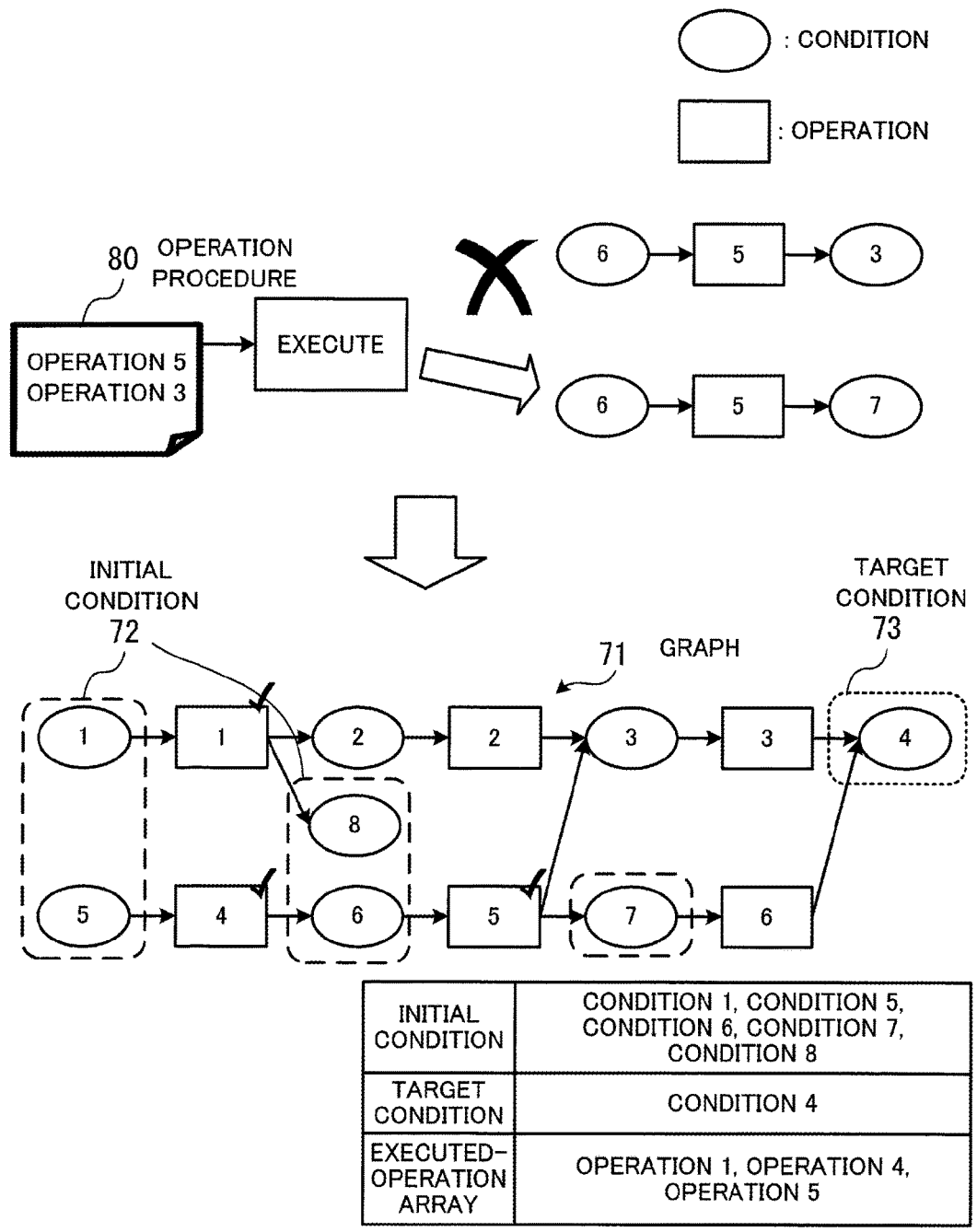
FIG. 25 is a sixth diagram illustrating the example of procedure search according to the third embodiment.

FIG. 25 is a sixth diagram illustrating the example of procedure search according to the third embodiment. When the operation procedure 80 is created, the operation execution unit 191 executes the first operation (operation ID "operation 5") of the operation procedure 80 on the operation object ICT system. According to the graph 71, the configuration of the operation object ICT system is expected to satisfy the condition with the condition ID "condition 3" in response to this operation. However, in the example of FIG. 25, as a result of execution of the operation with the operation ID "operation 5", the configuration of the operation object ICT system has satisfied another condition (condition ID "condition 7"), instead of the condition with the condition ID "condition 3".

When information is collected from the operation object ICT system after the operation, it is found from the work log that as a postcondition of the operation with the operation ID "operation 5", the condition with the condition ID "condition 7" is generated. Then, the graph creation unit 161 adds an edge from the node with the operation ID "operation 5" to the node with the condition ID "condition 7" to the graph 71. Further, it is found from the latest configuration information piece collected from the operation object ICT system that the ICT system has satisfied the condition with the condition ID "condition 7". Thus, the procedure search unit 181 adds the condition with the condition ID "condition 7" to the initial condition. Further, the procedure search unit 181 registers the operation ID "operation 5" of the operation executed by the operation execution unit 191 in the executed-operation array.

Figure 26:
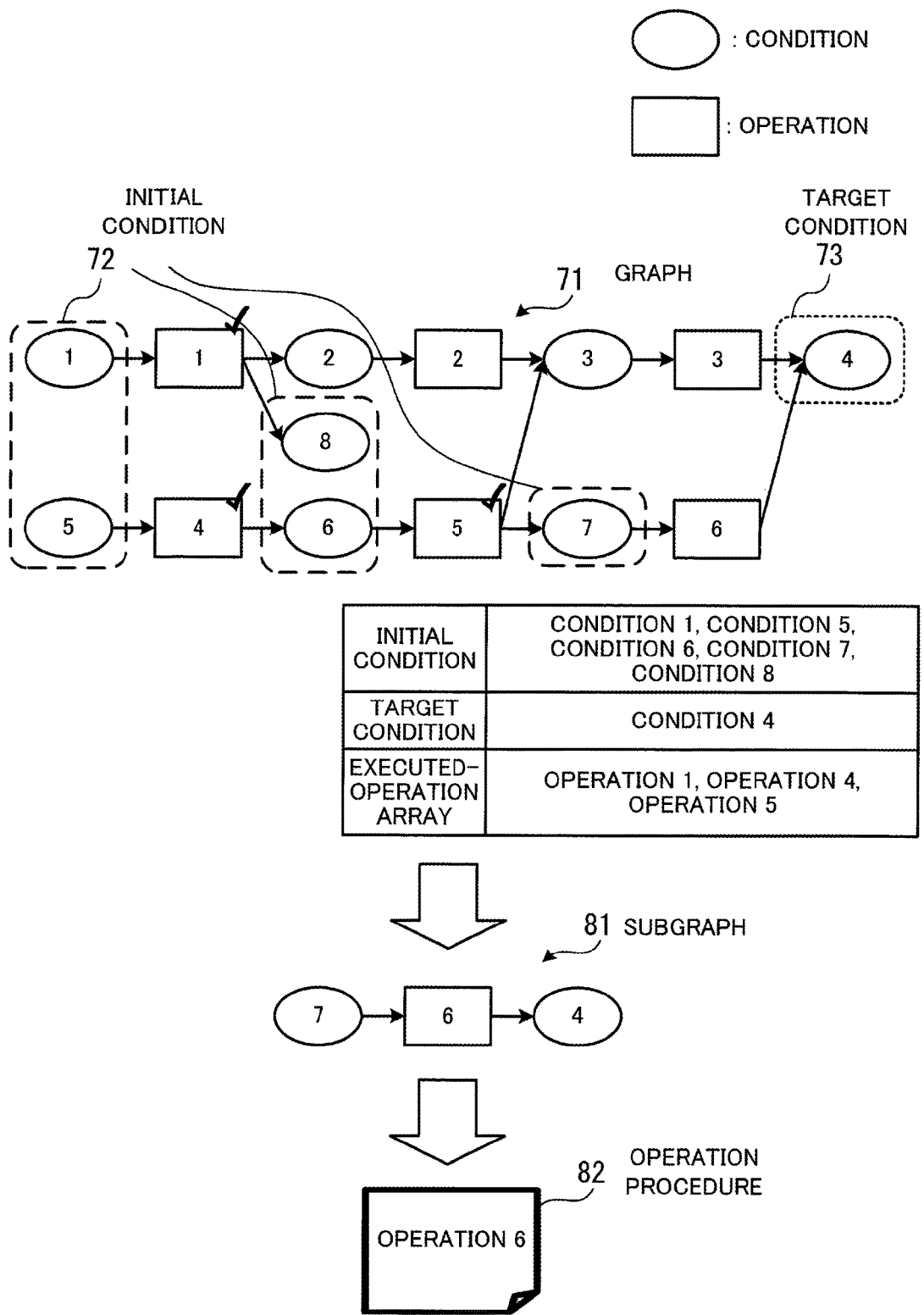
FIG. 26 is a seventh diagram illustrating the example of procedure search according to the third embodiment.

FIG. 26 is a seventh diagram illustrating the example of procedure search according to the third embodiment. An operation procedure is searched for based on the graph 71 after the third update. In this step, operations already executed are excluded from the subject of search. As a result, a subgraph 81 is obtained. Then, based on the subgraph 81, an operation procedure 82 is created. The operation procedure 82 indicates that the operation corresponding to the operation ID "operation 6" is executed.

Figure 27:
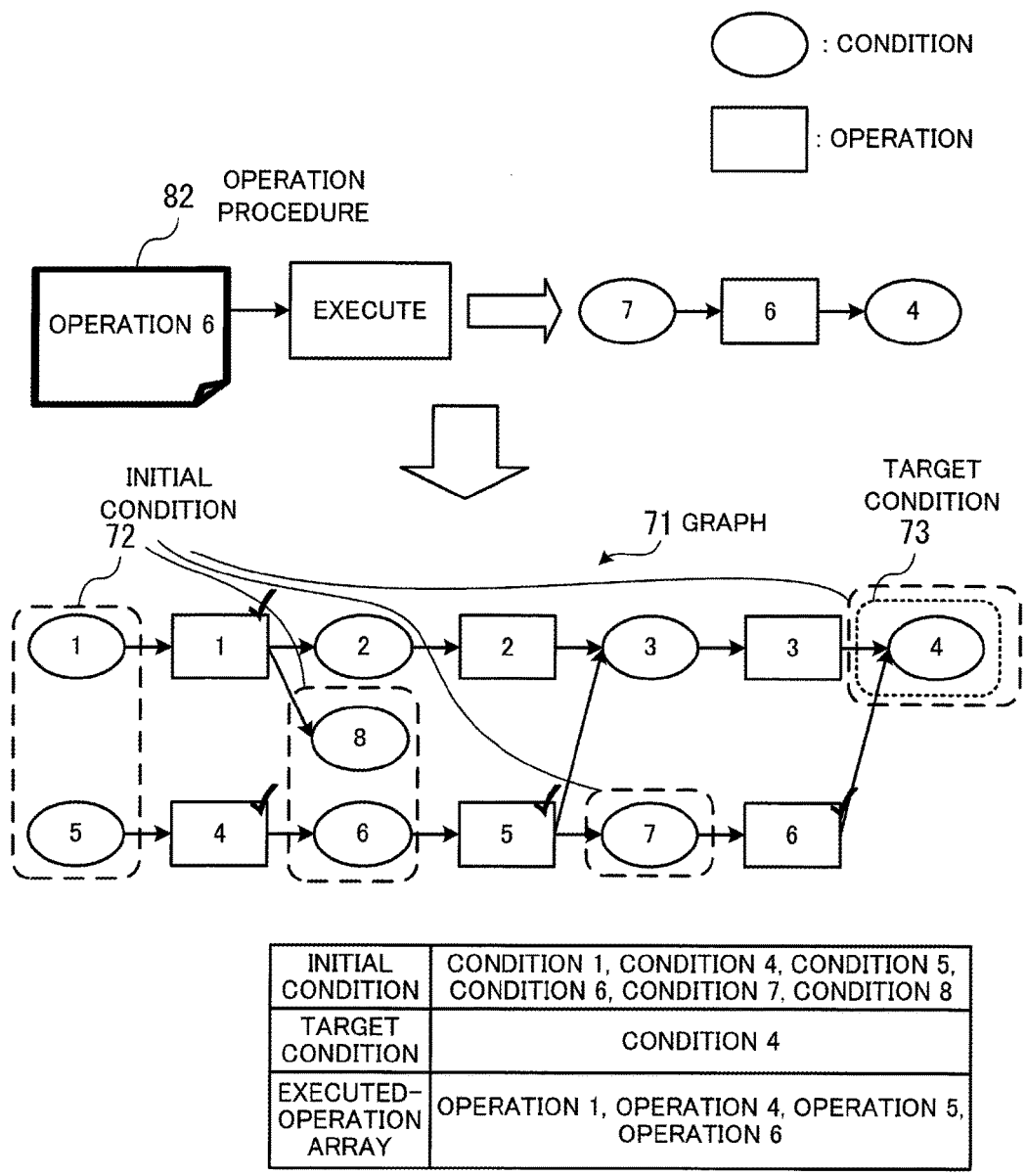
FIG. 27 is an eighth diagram illustrating the example of procedure search according to the third embodiment.

FIG. 27 is an eighth diagram illustrating the example of procedure search according to the third embodiment. When the operation procedure 82 is created, the operation execution unit 191 executes the operation (operation ID "operation 6") of the operation procedure 82 on the operation object ICT system. According to the graph 71, the configuration of the operation object ICT system is expected to satisfy the condition with the condition ID "condition 4" in response to this operation. In the example of FIG. 27, as a result of execution of the operation with the operation ID "operation 6", the configuration of the operation object ICT system has satisfied the condition with the condition ID "condition 4" as expected.

When information is collected from the operation object ICT system after the operation, it is found from the work log that as a postcondition of the operation with the operation ID "operation 6", the condition with the condition ID "condition 4" is generated. This condition is already included in the graph 71, and therefore the graph 71 is not updated. Further, it is found from the latest configuration information piece collected from the operation object ICT system that the ICT system has satisfied the condition with the condition ID "condition 4". Thus, the procedure search unit 181 adds the condition with the condition ID "condition 4" to the initial condition. Further, the procedure search unit 181 registers the operation ID "operation 6" of the operation executed by the operation execution unit 191 in the executed-operation array.

Then, when an operation search is attempted, the target condition is already included in the initial condition. This indicates that there is no operation to be executed. Then, the process ends.

In this manner, according to the third embodiment, even if the result of an operation performed on the operation object ICT system is not the expected one, it is possible to change the configuration of the ICT system to meet the target condition. This increases the chances of being able to automatically execute an operation for changing the configuration of the operation object ICT system to be the desired configuration, and thus makes it possible to reduce man-hours of the system administrator.

(d) Other Embodiments

There are cases in which the same operation has different preconditions or postconditions in different work logs. In view of this, when the graph creation units 160 and 161 create a graph, each edge connecting a condition and an operation in the graph is provided with a counter that counts "the number of times the edge is extracted from a log", "the number of times of execution in procedure extraction". Then, upon performing a search, in the case where the same operation has different edges in different generated subgraphs, the procedure search units 180 and 181 recognize a subgraph including the edge with a high count value as a "reliable graph", for example, and create an operation procedure based on this subgraph. Thus, it is possible to generate a reliable operation procedure.

In the above embodiments, a script is generated based on an operation procedure. However, a manual describing a procedure to be read and performed by a person may be created. In the procedure manual, for example, commands with step numbers are described according to the operational sequence, for ease of understanding by the administrator. Further, in order to facilitate work by the administrator, operating precautions and explanation about the expected operation result may be added in the procedure manual.

While particular embodiments of the present invention have been illustrated and described, it would be obvious that the components described in the embodiments may be replaced with other components having similar functions. Further, other arbitrary structures and steps may be added. Furthermore, two or more arbitrary structures (features) of the embodiments described above may be combined.

According to an aspect, the chances of being able to automatically generate an operation procedure applicable to the operation object system are increased.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer to perform a process comprising:
   determining, based on work logs each indicating a plurality of operations executed in previously-performed system change work and processing executed in accordance with the plurality of operations, a precondition and a postcondition for each of the plurality of operations, the precondition indicating an expected state of a system that is to execute processing corresponding to the each of the plurality of operations, the postcondition indicating an expected state of the system that has executed the processing corresponding to the each of the plurality of operations;
   associating each of the plurality of operations with an operation whose precondition matches a postcondition of the each of the plurality of operations, wherein the associating includes associating a first operation indicated in a first work log with a second operation indicated in a second work log different from the first work log, a precondition of the second operation matching a postcondition of the first operation;
   searching for a path that starts from an operation whose precondition matches an initial condition satisfied by an operation object system, traces an associated operation, and reaches an operation whose postcondition matches a target condition indicating a target state of the operation object system after work; and
   generating an operation procedure in which operations on the path found by the search are arranged in order.

2. The non-transitory computer-readable storage medium according to claim 1, wherein:
   the associating includes creating a graph in which each of the plurality of operations is a transition source operation and an operation whose precondition matches a postcondition of the transition source operation is a transition destination operation, the graph defining a transition from the transition source operation to the transition destination operation; and
   the searching includes searching, based on the initial condition satisfied by the operation object system and the target condition to be satisfied by the operation object system upon performing the work, the graph for the path that starts from the operation whose precondition matches the initial condition, traces a transition to an operation whose precondition matches a postcondition of an already traced operation or the initial condition, and reaches the operation whose postcondition matches the target condition.

3. The non-transitory computer-readable storage medium according to claim 2, wherein:
   the process further includes calculating, for information that is defined to be present in a system by a precondition or a postcondition, a state of a system in which the information is usable, based on the work logs; and
   the searching includes tracing a transition to an operation in which information used in each of a precondition and a postcondition thereof is usable in the operation object system, among the operations included in the graph.

4. The non-transitory computer-readable storage medium according to claim 2, wherein the process further includes:
   each time an operation procedure is generated, executing a first operation indicated in the operation procedure, with respect to the operation object system;
   each time an operation is executed, updating the graph by adding a condition that is satisfied by the operation object system in response to execution of the operation, to a postcondition of the operation;
   each time the graph is updated, adding the condition that is satisfied by the operation object system in response to execution of the operation, to the initial condition, and searching the graph for a path that starts from an unexecuted operation whose precondition matches the initial condition, traces an operation whose precondition matches a postcondition of an already traced operation or the initial condition, and reaches the operation whose postcondition matches the target condition; and
   each time a path is found by the search, generating an operation procedure in which operations on the found path are arranged in order.

5. The non-transitory computer-readable storage medium according to claim 1, wherein:
   the process further includes calculating a state of a system in which processing corresponding to each of the plurality of operations is executable, based on the work logs; and
   the searching includes tracing a transition to an operation that is executable in a state of the operation object system.

6. The non-transitory computer-readable storage medium according to claim 1, wherein the process further includes operating the operation object system in accordance with the generated operation procedure.

7. An operation search method comprising:
   determining, by a processor, based on work logs each indicating a plurality of operations executed in previously-performed system change work and processing executed in accordance with the plurality of operations, a precondition and a postcondition for each of the plurality of operations, the precondition indicating an expected state of a system that is to execute processing corresponding to the each of the plurality of operations, the postcondition indicating an expected state of the system that has executed the processing corresponding to the each of the plurality of operations;
   associating, by the processor, each of the plurality of operations with an operation whose precondition matches a postcondition of the each of the plurality of operations, wherein the associating includes associating a first operation indicated in a first work log with a second operation indicated in a second work log different from the first work log, a precondition of the second operation matching a postcondition of the first operation;

searching, by the processor, for a path that starts from an operation whose precondition matches an initial condition satisfied by an operation object system, traces an associated operation, and reaches an operation whose postcondition matches a target condition indicating a target state of the operation object system after work; and generating, by the processor, an operation procedure in which operations on the path found by the search are arranged in order.

8. An operation search apparatus comprising:

a processor configured to perform a process including:

determining, based on work logs each indicating a plurality of operations executed in previously-performed system change work and processing executed in accordance with the plurality of operations, a precondition and a postcondition for each of the plurality of operations, the precondition indicating an expected state of a system that is to execute processing corresponding to the each of the plurality of operations, the postcondition indicating an expected state of the system that has executed the processing corresponding to the each of the plurality of operations, associating each of the plurality of operations with an operation whose precondition matches a postcondition of the each of the plurality of operations, wherein the associating includes associating a first operation indicated in a first work log with a second operation indicated in a second work log different from the first work log, a precondition of the second operation matching a postcondition of the first operation, searching for a path that starts from an operation whose precondition matches an initial condition satisfied by an operation object system, traces an associated operation, and reaches an operation whose postcondition matches a target condition indicating a target state of the operation object system after work, and generating an operation procedure in which operations on the path found by the search are arranged in order.

* * * * *